United States Patent
Simpson et al.

(10) Patent No.: US 12,340,080 B2
(45) Date of Patent: *Jun. 24, 2025

(54) COMPUTER BALL DEVICE FOR MIXED REALITY, VIRTUAL REALITY, OR AUGMENTED REALITY

(71) Applicant: Circlesx LLC, Houston, TX (US)

(72) Inventors: Erik Mowery Simpson, Houston, TX (US); Kenneth Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,392

(22) Filed: Nov. 22, 2023

(65) Prior Publication Data
US 2024/0086054 A1 Mar. 14, 2024

Related U.S. Application Data

(63) Continuation of application No. 17/971,535, filed on Oct. 21, 2022, now Pat. No. 11,829,594, which is a
(Continued)

(51) Int. Cl.
*G06F 3/00* (2006.01)
*G02B 27/01* (2006.01)
(Continued)

(52) U.S. Cl.
CPC ..... *G06F 3/04845* (2013.01); *G02B 27/0172* (2013.01); *G03H 1/0005* (2013.01);
(Continued)

(58) Field of Classification Search
CPC .... G06F 3/04845; G06F 3/011; G06F 3/0304; G02B 27/0172; G02B 2027/0138;
(Continued)

(56) References Cited

U.S. PATENT DOCUMENTS

D209,710 S 12/1967 Bruce
4,476,954 A 10/1984 Johnson et al.
(Continued)

FOREIGN PATENT DOCUMENTS

CN 107341968 A 11/2017
GB 2539556 A 12/2016
(Continued)

OTHER PUBLICATIONS

Freebeat, Smart Exercise Bike; retrieved from internet: https://www.amazon.com/Resistance-Cushioned-Detection-Altorithm-Instructors/dp/BOBZKKZ6B3/?th=1; Mar. 3, 2023; p. 1.
(Continued)

*Primary Examiner* — Sarah Lhymn
(74) *Attorney, Agent, or Firm* — Pramudji Law Group PLLC; Ari Pramudji

(57) ABSTRACT

Implementations of various computer methods to couple a computerized ball device which acts as a mobile computing device to record the users environment and project light towards waveguide eyeglasses or contacts which then allows a user to view imbedded light structure holograms in the waveguide while viewing the actual world. The computer ball device additionally has the ability to be docked in a drone cradle which creates a database map of the user's environment while not being utilized by the user for an immediate task. The device may also attach to a wrist band for mobility. The device also has the ability to couple the projected light structures so that a plurality of users may view the same light structure content to build an environment of trust. The device decouples the traditional design of head mounted virtual and mixed reality that place together the camera with the head mounted device.

20 Claims, 15 Drawing Sheets

Related U.S. Application Data continuation of application No. 16/666,264, filed on Oct. 28, 2019, now Pat. No. 11,500,526, which is a continuation of application No. 15/406,374, filed on Jan. 13, 2017, now Pat. No. 10,460,520.

(51) Int. Cl.

| | | |
|---|---|---|
| *G03H 1/00* | (2006.01) | |
| *G06F 1/16* | (2006.01) | |
| *G06F 3/01* | (2006.01) | |
| *G06F 3/03* | (2006.01) | |
| *G06F 3/04845* | (2022.01) | |
| *G06T 15/20* | (2011.01) | |
| *G06T 19/00* | (2011.01) | |
| *G09B 5/06* | (2006.01) | |
| *G09B 19/00* | (2006.01) | |
| *G03H 1/22* | (2006.01) | |
| *G09B 15/00* | (2006.01) | |
| *G09B 19/24* | (2006.01) | |

(52) U.S. Cl.
CPC ............ *G06F 1/1632* (2013.01); *G06F 3/011* (2013.01); *G06F 3/013* (2013.01); *G06F 3/017* (2013.01); *G06F 3/0304* (2013.01); *G06T 15/20* (2013.01); *G06T 19/006* (2013.01); *G09B 5/067* (2013.01); *G09B 19/00* (2013.01); *G09B 19/0038* (2013.01); *G02B 2027/0138* (2013.01); *G02B 2027/014* (2013.01); *G02B 2027/0174* (2013.01); *G02B 2027/0178* (2013.01); *G03H 2001/0061* (2013.01); *G03H 2001/2284* (2013.01); *G06F 1/163* (2013.01); *G06F 1/1686* (2013.01); *G06F 1/1694* (2013.01); *G06T 2219/024* (2013.01); *G09B 15/00* (2013.01); *G09B 19/0092* (2013.01); *G09B 19/24* (2013.01)

(58) Field of Classification Search
CPC ...... G02B 2027/014; G02B 2027/0174; G06T 15/20; G06T 19/006; G06T 2219/024
See application file for complete search history.

(56) References Cited

U.S. PATENT DOCUMENTS

| | | |
|---|---|---|
| D318,073 S | 7/1991 | Jang |
| 5,249,259 A | 9/1993 | Harvey |
| 5,412,560 A | 5/1995 | Dennison |
| 5,604,676 A | 2/1997 | Penzias |
| 5,726,885 A | 3/1998 | Klein et al. |
| 5,751,245 A | 5/1998 | Janky et al. |
| 5,948,040 A | 9/1999 | DeLorme |
| 5,973,619 A | 10/1999 | Paredes |
| 6,175,831 B1 | 1/2001 | Weinreich et al. |
| 6,240,396 B1 | 5/2001 | Walker et al. |
| 6,285,999 B1 | 9/2001 | Page |
| D453,945 S | 2/2002 | Shan |
| 6,356,838 B1 | 3/2002 | Paul |
| 6,400,996 B1 | 6/2002 | Hoffberg |
| D460,952 S | 7/2002 | Kataoka |
| 6,421,606 B1 | 7/2002 | Asai et al. |
| 6,434,530 B1 | 8/2002 | Sloane et al. |
| D468,738 S | 1/2003 | Lin |
| D469,089 S | 1/2003 | Lin |
| 6,609,103 B1 | 8/2003 | Kolls |
| 6,618,062 B1 | 9/2003 | Brown et al. |
| 6,646,659 B1 | 11/2003 | Brown et al. |
| 6,663,564 B2 | 12/2003 | Miller-Kovach et al. |
| 6,708,879 B2 | 3/2004 | Hunt |
| 6,850,907 B2 | 2/2005 | Lutnick et al. |
| 7,090,638 B2 | 8/2006 | Vidgen |
| 7,373,320 B1 | 5/2008 | Mcdonough |
| D590,396 S | 4/2009 | Lo |
| 7,584,123 B1 | 9/2009 | Karonis et al. |
| 7,634,442 B2 | 12/2009 | Alvarado et al. |
| 7,680,690 B1 | 3/2010 | Catalano |
| 7,680,770 B1 | 3/2010 | Buyukkokten et al. |
| 7,711,629 B2 | 5/2010 | Laurent et al. |
| 7,747,739 B2 | 6/2010 | Bridges et al. |
| 7,756,633 B2 | 7/2010 | Huang et al. |
| 7,788,207 B2 | 8/2010 | Alcom et al. |
| D628,171 S | 11/2010 | Hakopian |
| 7,886,166 B2 | 2/2011 | Shnekendorf et al. |
| D638,879 S | 5/2011 | Suto |
| 7,987,110 B2 | 7/2011 | Cases et al. |
| 8,024,234 B1 | 9/2011 | Thomas et al. |
| 8,065,191 B2 | 11/2011 | Senior |
| D650,385 S | 12/2011 | Chiu |
| 8,121,780 B2 | 2/2012 | Gerdes et al. |
| 8,249,946 B2 | 8/2012 | Froseth et al. |
| 8,296,335 B2 | 10/2012 | Bouve et al. |
| 8,388,451 B2 | 3/2013 | Auterio et al. |
| 8,570,244 B2 | 10/2013 | Mukawa |
| 8,762,035 B2 | 6/2014 | Levine et al. |
| 8,798,593 B2 | 8/2014 | Haney |
| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 1/2016 | Anglin et al. |
| 9,292,764 B2 | 3/2016 | Yun et al. |
| 9,387,928 B1 | 7/2016 | Gentry et al. |
| 9,389,090 B1 | 7/2016 | Levine et al. |
| 9,389,094 B2 | 7/2016 | Brenner et al. |
| 9,410,963 B2 | 8/2016 | Martin et al. |
| 9,436,923 B1 | 9/2016 | Sriram et al. |
| D772,828 S | 11/2016 | Kusumoto |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,952,042 B2 | 4/2018 | Abovitz et al. |
| 9,960,637 B2 | 5/2018 | Sanders et al. |
| 9,978,282 B2 | 5/2018 | Lambert et al. |
| 10,082,793 B1 | 9/2018 | Glaser |
| D832,355 S | 10/2018 | Castro |
| 10,216,367 B1 | 2/2019 | Patel |
| 10,262,289 B2 | 4/2019 | Vaananen |
| 10,395,332 B1 | 8/2019 | Konrardy et al. |
| 10,403,050 B1 | 9/2019 | Beall et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| D896,315 S | 9/2020 | Castro |
| 10,872,381 B1 | 10/2020 | Leise et al. |
| 10,832,337 B1 | 11/2020 | Floyd et al. |
| D903,657 S | 12/2020 | Catania |
| D903,658 S | 12/2020 | Catania |
| D903,659 S | 12/2020 | Catania |
| D910,758 S | 2/2021 | Leong |
| 11,138,827 B2 | 10/2021 | Simpson |
| D938,375 S | 12/2021 | Zhang |
| 11,288,563 B2 | 3/2022 | Lee et al. |
| 11,296,897 B2 | 4/2022 | Endress et al. |
| 11,298,017 B2 | 4/2022 | Tran |
| 11,298,591 B2 | 4/2022 | Evancha |
| 11,537,953 B2 | 12/2022 | Beaurepaire |
| 11,555,709 B2 | 1/2023 | Simpson |
| 11,586,993 B2 | 2/2023 | Handler et al. |
| D980,210 S | 3/2023 | Wu |
| 11,651,464 B2 | 5/2023 | Park |
| D993,316 S | 7/2023 | Lin |
| 11,704,219 B1 | 7/2023 | Lerner et al. |

(56) References Cited

U.S. PATENT DOCUMENTS

| | | |
|---|---|---|
| 11,722,500 B2 | 8/2023 | Singh |
| 11,734,618 B2 | 8/2023 | Ogden |
| D1,000,137 S | 10/2023 | Shuster |
| D1,007,451 S | 12/2023 | Im |
| D1,024,065 S | 4/2024 | Kim |
| 2002/0004788 A1 | 1/2002 | Gros et al. |
| 2002/0013718 A1 | 1/2002 | Cornwell |
| 2002/0013761 A1 | 1/2002 | Bundy |
| 2002/0017997 A1 | 2/2002 | Wall |
| 2002/0065738 A1 | 5/2002 | Riggs et al. |
| 2002/0065766 A1 | 5/2002 | Brown et al. |
| 2002/0128952 A1 | 9/2002 | Melkomian |
| 2002/0133456 A1 | 9/2002 | Lancaster et al. |
| 2002/0161689 A1 | 10/2002 | Segal |
| 2003/0055776 A1 | 3/2003 | Samuelson |
| 2003/0191725 A1 | 10/2003 | Ratliff et al. |
| 2003/0233311 A1 | 12/2003 | Bramnick et al. |
| 2004/0019552 A1 | 1/2004 | Tobin |
| 2004/0115596 A1 | 6/2004 | Snyder et al. |
| 2004/0249742 A1 | 12/2004 | Laurent et al. |
| 2004/0254819 A1 | 12/2004 | Halim |
| 2004/0260581 A1 | 12/2004 | Baranowski et al. |
| 2005/0021346 A1 | 1/2005 | Nadan et al. |
| 2005/0027637 A1 | 2/2005 | Kohler |
| 2005/0132070 A1 | 6/2005 | Redlich et al. |
| 2005/0288974 A1 | 12/2005 | Baranowski et al. |
| 2005/0288986 A1 | 12/2005 | Barts et al. |
| 2006/0104224 A1 | 5/2006 | Singh |
| 2006/0184321 A1 | 8/2006 | Kawakami |
| 2007/0005224 A1 | 1/2007 | Sutardja |
| 2007/0260723 A1 | 11/2007 | Cohen |
| 2008/0033833 A1 | 2/2008 | Senior |
| 2008/0040232 A1 | 2/2008 | Perchthaler |
| 2008/0077309 A1 | 3/2008 | Cobbold |
| 2008/0129490 A1 | 6/2008 | Linville et al. |
| 2008/0140557 A1 | 6/2008 | Bowlby et al. |
| 2008/0157990 A1 | 7/2008 | Belzer et al. |
| 2008/0195432 A1 | 8/2008 | Fell et al. |
| 2008/0262892 A1 | 10/2008 | Prager et al. |
| 2009/0221338 A1 | 9/2009 | Stewart |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2009/0309729 A1 | 12/2009 | Nichols |
| 2010/0042421 A1 | 2/2010 | Bai et al. |
| 2010/0081548 A1 | 4/2010 | Labedz |
| 2010/0114790 A1 | 5/2010 | Strimling et al. |
| 2010/0191834 A1 | 7/2010 | Zampiello |
| 2010/0208029 A1 | 8/2010 | Marti |
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280748 A1 | 11/2010 | Mundinger et al. |
| 2010/0280884 A1 | 11/2010 | Levine et al. |
| 2010/0306078 A1 | 12/2010 | Hwang |
| 2010/0318373 A1 | 12/2010 | Harris |
| 2011/0025267 A1 | 2/2011 | Kamen et al. |
| 2011/0059693 A1 | 3/2011 | O'Sullivan |
| 2011/0098056 A1 | 4/2011 | Rhoads et al. |
| 2011/0106660 A1 | 5/2011 | Ajjarapu et al. |
| 2011/0184784 A1 | 7/2011 | Rudow |
| 2011/0191248 A1 | 8/2011 | Bishop |
| 2011/0202418 A1 | 8/2011 | Kempton et al. |
| 2012/0023032 A1 | 1/2012 | Visdomini |
| 2012/0075067 A1 | 3/2012 | Attaluri |
| 2012/0078743 A1 | 3/2012 | Betancourt |
| 2012/0101629 A1 | 4/2012 | Olsen et al. |
| 2012/0136527 A1 | 5/2012 | McQuade |
| 2012/0158762 A1 | 6/2012 | IwuchukWu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0035973 A1 | 2/2013 | Desai et al. |
| 2013/0132261 A1 | 5/2013 | Ebersole |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0268325 A1 | 10/2013 | Dembo |
| 2013/0275156 A1 | 10/2013 | Kinkaid et al. |
| 2013/0304522 A1 | 11/2013 | Cundle |
| 2013/0311264 A1 | 11/2013 | Solomon et al. |
| 2014/0032034 A1* | 1/2014 | Raptopoulos ........ G05D 1/0088 701/25 |
| 2014/0038781 A1 | 2/2014 | Foley |
| 2014/0052500 A1 | 2/2014 | Vallapuzha et al. |
| 2014/0075528 A1 | 3/2014 | Matsuoka |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0180732 A1 | 6/2014 | Rotchin |
| 2014/0220516 A1 | 8/2014 | Marshall et al. |
| 2014/0229258 A1 | 8/2014 | Seriani |
| 2014/0236641 A1 | 8/2014 | Dawkins |
| 2014/0244413 A1 | 8/2014 | Senior |
| 2014/0282586 A1 | 9/2014 | Shear et al. |
| 2014/0310019 A1 | 10/2014 | Blander et al. |
| 2014/0310149 A1 | 10/2014 | Singh |
| 2014/0324633 A1 | 10/2014 | Pollak et al. |
| 2014/0349672 A1 | 11/2014 | Kern et al. |
| 2015/0006428 A1 | 1/2015 | Miller et al. |
| 2015/0016777 A1 | 1/2015 | Abovitz et al. |
| 2015/0058051 A1 | 2/2015 | Movshovich |
| 2015/0097864 A1 | 4/2015 | Alaniz |
| 2015/0154516 A1 | 6/2015 | Joachim |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgumy et al. |
| 2016/0018969 A1* | 1/2016 | Sundarraman ........ H04W 4/023 715/747 |
| 2016/0026253 A1 | 1/2016 | Bradski et al. |
| 2016/0034305 A1 | 2/2016 | Shear et al. |
| 2016/0041628 A1 | 2/2016 | Verma |
| 2016/0063436 A1* | 3/2016 | Coles ............... G06Q 10/08345 705/335 |
| 2016/0117657 A1 | 4/2016 | Forbes, Jr. et al. |
| 2016/0117756 A1 | 4/2016 | Carr et al. |
| 2016/0148289 A1 | 5/2016 | Altschuler |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0221935 A1 | 8/2016 | Jaworska-Maslanka |
| 2016/0224935 A1 | 8/2016 | Burnett |
| 2016/0225115 A1 | 8/2016 | Levy et al. |
| 2016/0253662 A1 | 9/2016 | Sriram |
| 2016/0307276 A1 | 9/2016 | Young |
| 2016/0297316 A1 | 10/2016 | Penilla et al. |
| 2016/0298977 A1 | 10/2016 | Newlin |
| 2016/0300296 A1 | 10/2016 | Alonso Cembrano |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |

(56) References Cited

U.S. PATENT DOCUMENTS

| | | |
|---|---|---|
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1 | 8/2017 | Dawkins |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1 | 10/2017 | Rathod |
| 2017/0318325 A1* | 11/2017 | Ortiz ............... H04N 21/436 |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0088455 A1 | 3/2018 | Cippant |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0165354 A1 | 6/2018 | Mehta et al. |
| 2018/0173742 A1 | 6/2018 | Liu et al. |
| 2018/0173800 A1 | 6/2018 | Chang et al. |
| 2018/0188715 A1 | 7/2018 | Cella et al. |
| 2018/0209801 A1* | 7/2018 | Stentz ............... G05D 1/0274 |
| 2018/0209803 A1 | 7/2018 | Rakah |
| 2018/0238705 A1* | 8/2018 | O'Herlihy ............ G06Q 50/40 |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0019144 A1 | 1/2019 | Gillen |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung et al. |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0180862 A1 | 6/2019 | Wisser et al. |
| 2019/0186942 A1 | 6/2019 | Rubin |
| 2019/0188450 A1 | 6/2019 | Spivack et al. |
| 2019/0202448 A1 | 7/2019 | Pal et al. |
| 2019/0204110 A1 | 7/2019 | Dubielzyk |
| 2019/0205798 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0251503 A1 | 8/2019 | Simpson |
| 2019/0251509 A1 | 8/2019 | Simpson |
| 2019/0259008 A1 | 8/2019 | Lindsey |
| 2019/0271553 A1 | 9/2019 | Simpson |
| 2019/0272589 A1 | 9/2019 | Simpson |
| 2019/0293438 A1 | 9/2019 | Simpson |
| 2019/0304000 A1 | 10/2019 | Simpson |
| 2019/0311431 A1 | 10/2019 | Simpson |
| 2019/0318286 A1 | 10/2019 | Simpson |
| 2019/0324989 A1 | 10/2019 | Borochoff et al. |
| 2019/0325541 A1 | 10/2019 | Simpson |
| 2019/0333166 A1 | 10/2019 | Simpson |
| 2019/0333181 A1 | 10/2019 | Simpson |
| 2019/0353499 A1 | 11/2019 | Stenneth |
| 2020/0013498 A1 | 1/2020 | Gelber |
| 2020/0027096 A1 | 1/2020 | Cooner |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0219017 A1 | 7/2020 | Simpson |
| 2020/0226853 A1 | 7/2020 | Ahmed et al. |
| 2020/0317074 A1 | 10/2020 | Miller et al. |
| 2020/0317075 A1 | 10/2020 | Yokoyama et al. |
| 2020/0389301 A1 | 12/2020 | Detres et al. |
| 2021/0004909 A1 | 1/2021 | Farmer et al. |
| 2021/0012278 A1 | 1/2021 | Alon et al. |
| 2021/0041258 A1 | 2/2021 | Simpson |
| 2021/0042835 A1 | 2/2021 | Simpson |
| 2021/0065100 A1 | 3/2021 | Hwang |
| 2021/0158447 A1 | 5/2021 | Simpson |
| 2021/0166317 A1 | 6/2021 | Simpson |
| 2021/0248633 A1 | 8/2021 | Simpson |
| 2021/0318132 A1 | 10/2021 | Simpson |
| 2021/0326872 A1 | 10/2021 | Robotham |
| 2021/0379447 A1 | 12/2021 | Lee |
| 2021/0382924 A1 | 12/2021 | Aaltonen et al. |
| 2022/0020073 A1 | 1/2022 | Farmer |
| 2022/0068081 A1 | 3/2022 | Pariseau |
| 2022/0100731 A1 | 3/2022 | Tirapu Azpiroz et al. |
| 2022/0122026 A1 | 4/2022 | Okabe et al. |
| 2023/0157579 A1 | 5/2023 | Sato |
| 2023/0377409 A1 | 11/2023 | Rye |

FOREIGN PATENT DOCUMENTS

| | | | |
|---|---|---|---|
| JP | 2003177034 A | | 12/2001 |
| KR | 20170078094 A1 | | 12/2015 |
| WO | 9508240 A2 | | 3/1995 |
| WO | 2001041084 A2 | | 6/2001 |
| WO | 2015059691 A1 | | 4/2015 |
| WO | 2015161307 A1 | | 4/2015 |
| WO | 2018024844 A1 | | 2/2018 |
| WO | 2019/134005 A1 | | 7/2019 |
| WO | 2019183468 A1 | | 9/2019 |
| WO | 2021/163675 A1 | | 8/2021 |

OTHER PUBLICATIONS

Aratani, Lori, "This app wants to reward you for smart commuting choices," The Washington Post, Aug. 18, 2018, pp. 1-3.

Yu, Haicong et al.; "A Multi-Modal Route Planning Approach with an Improved Genetic Algorithm", The International Archives of the Photogrammetry, Remote Sensing and Spaital Information Sciences, vol. 38, Part 1, 2010.

PCT International Search Report and Written Opinion; PCT/US2020/027543; Jul. 1, 2020.

PCT International Search Report and Written Opinion; PCT/US2020/023223; Jun. 1, 20209.

PCT International Search Report and Written Opinion; PCT/US2020/023729; Jun. 1, 20208.

PCT International Search Report and Written Opinion; PCT/US2020/021546; Jun. 8, 2020.

PCT International Search Report and Written Opinion; PCT/US2020/018012; Apr. 2, 20201.

(56) References Cited

OTHER PUBLICATIONS

PCT International Search Report and Written Opinion; PCT/US2020/012208; Mar. 2, 20204.
Westerman; Longitudinal Analysis of Biomarker Data from a Personalized Nutrition Platform in Healthy Subjects; Nature, Scientific Reports; vol. 8; Oct. 2, 2018 (retrieved Jun. 1, 20200).
Ahmed, et al.; Energy Trading with Electric Vehicles in Smart Campus Parking Lots; Applied Sciences; Sep. 7, 2018.
Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?
Peters, et al.; Student Support Services for Online Learning Re-Imagined and Re-Invigorated: Then, Now and What's to Come; Contact North | Contact Nord; Sep. 2017.
Soccer ball-shaped drone might be the safest flying robot yet https://mashable.com/2015/12/21/soccer-ball-drone/ ; Dec. 21, 2015.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
U.S. Appl. No. 60/035,205; filed Jan. 10, 1997; Page.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool for YOur Business, https://www.reedsmith.com/-/media/files/perspectives/2007/02/freight-derivatives--a-vital-tool-for-your-business/files/freight-derivatives--a vital-tool-for-your-business/fileattachment/etcfreightderivativesavitaltoolforyourbusiness.pdf (Year: 2007), Energy, Trade & Commodities, pp. 1-3.
Barry, Kieth, App lets drivers auction public parking spaces, Wired, Aug. 11, 2011, pp. 1-4.
Jiang, Landu, et al., Sun Chase: Energy-Efficient Route Planning for solar-powered Evs, IEEE 37th international conference on distrubuted computing systems, 2017, pp. 1-11.
Netlingo, https://web.archive.org/web/20170122184857/https://www.netlingo.com/word/electronic-exchange.php,dated Oct. 22, 2017.
Laseter, Tim, "B2B benchmark: The State of Electronic Exchanges", Tech & Innovation, dated Oct. 1, 2001.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDKOM2, pp. 1-14, Aug. 2020.
Radocchia, Samantha, 3 Innovative Ways Blockchain Will Build Trust in the Food Industry, https://www.forbes.com/sites/samantharadocchia/2018/04/26/3-innovative-ways-blockchain-will-build-trust-in-the-food-industry/? sh=65bc79f42afc, Forbes, pp. 1-5, Apr. 26, 2018.
Change the World, https://fortune.com/change-the-world/2019/ibm/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Ramasubramanian, Vasant, "Quadrasense: Immersive UAV-based cross-reality environmental sensor networks," phD diss., Massachusetts Institute of Technology, pp. 1-75, 2015.
Wyzant, https://web.archive.org/web/20190327185429/https://www.wyzant.com/hotitworks/students, Wyzant tutoring, pp. 1-13 , Mar. 27, 2019.
PCT International Search Report and Written Opinion; PCT/US2021/065855; Mar. 2, 20229.
PCT International Search Report and Written Opinion; PCT/US2022/012717; Mar. 3, 20220.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
PCT International Search Report and Written Opinion; PCT/US2022/027077; Nov. 1, 2022.
Wei, et al. "impact of aircraft size and seat availability on airlines demand and market share in duopoly markets" Published by Elsevier, 2005, pp. 315-327.
PCT International Search Report and Written Opinion; PCT/US2022/052969; Mar. 2, 20231.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, 2008 Sept 6, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; Mar. 8, 2023.
EP23153137.7 European Search Report, May 2, 20234, pp. 1-10.
EP20787830.7 European Search Report, May 1, 20232, pp. 1-10.
Zheyong, Bian, et al., "Planning the Ridesharing Route for the First-Mile Service Linking to Railway Passenger Transportation," Joint Rail Conference, Apr. 2017, pp. 1-11.
EP23168879.7 European Search Report, Jul. 5, 2023, pp. 1-13.
Papa, U., & Del Core, G., "Design of Sonar Sensor Model for Safe Landing of an UAV," IEEE Metrology for Aerospace, 2015, pp. 346-350.
Jundong, Li, et al., "Multi-network Embedding", pp. 1-9, 2018.
Bortolini, et al.; "Fresh food sustainable distribution: cost, delivery time and carbon footprint three-objective optimization," 2016, pp. 1-12.
Fulldomepro, VR Aquatic Simulator with a Dome, Pub. Sep. 3, 2018, https://www.youtube.com/watch? v=k_53G5DksjQ, pp. 1-2.
Randomoneh, Dome Screens & Displays, Pub. Oct. 1, 20122, https:// hardforum.com/threads/dome-screens-displays, p. 1.
Borgobello, Bridget, TOOB Personal Dome Screen Revamped, Pub. Jan. 1, 20122, https://newatlas.com/toob-earth-personal-dome-screen/21082, p. 1.
Asghari, et al; "Price-aware Real-time Ride-sharing at Scale-An Auction-based Approach", Oct. 31, 2016, SIGSPACIAL'16: Proceedings of the 24th ACM SIGSPATIAL International Conference on Advances in Geographic Information Systems, Article No. 3, pp. 1-10.
EP22740218.7 European Search Report, Nov. 12, 2024, pp. 1-29.
"Node Influence Metric", Wikipedia, Nov. 6, 2020, pp. 1-5.
EP21916571 European Search Report, May 29, 2024, pp. 1-9.
Karbassi, et al.; "Vehicle Route Prediction and Time of Arrival Estimation Techniques for Improved Transportation System Management" Published by IEEE; 2003, pp. 511-516.
EP23153137.7 Exam Report (Communication pursuant to Article 94(3) EPC), Mar. 5, 2025, pp. 1-11.
Chang, et al., "Estimating Real-Time Traffic Carbon Dioxide Emissions Based on Intelligent Transportation System Technologies," IEEE Mar. 1, 2023, vol. 14, pp. 1-11.
Aratani, Lore, "This app wants to reward you for smart commuting choices," The Washington Post, Aug. 18, 2018, pp. 1-3.
Yu, Haicong et al.; "A Mutil-Modal Route Planning Approach with an Improved Genetic Algorithm", The International Archives of the Photogrammetry, Remote Sensing and Spaital Information Sciences, vol. 38, Part I, 2010.

(56) References Cited

OTHER PUBLICATIONS

Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.

Freebeat, Smart Exercise Bike; retrieved from internet: https://www.amazon.com/Resistance-Cushioned-Detection-Altorithm-Instructors/dp/B0BZKKZ6B3/?th=1; Mar. 3, 2023; p. 1.

Valdes, J. J.,et al.; (Sep. 2007). Virtual reality high dimensional objectives spaces for multi-objective optimization: An improved representation. In 2007 IEEE Congress on Evolutionary Computation (pp. 4191-4198). IEEE., pp. 1-11.

Valdes, J. J.,et al.; (2007). Multi-objective evolutionary optimization for constructing neural networks for virtual reality visual data mining: Application to geophysical prospecting. Neural networks, 20(4), pp. 498-508.

Zhao, et al., Deshpanda, P. M., Naughton, J. F., & Shukla, A (Jun. 1998). Simultaneous optimization and evalution of multiple dimensional queries. In Proceedings of the 1998 ACM SIGMOD international conference on Management of data (pp. 271-282).

\* cited by examiner

COMPUTER BALL DEVICE FOR MIXED REALITY, VIRTUAL REALITY, OR AUGMENTED REALITY

CROSS-REFERENCE TO RELATED APPLICATIONS

This application is a continuation of U.S. patent application Ser. No. 17/971,535, filed on Oct. 21, 2022, which is a continuation of U.S. patent application Ser. No. 16/666,264, filed on Oct. 28, 2019 and issued as U.S. Pat. No. 11,500,526 on Nov. 15, 2022, which is a continuation of U.S. patent application Ser. No. 15/406,374, filed on Jan. 13, 2017 and issued as U.S. Pat. No. 10,460,520 on Oct. 29, 2019. All of these applications are incorporated by reference herein in their entireties.

BACKGROUND OF THE INVENTION

Field of the Invention

Implementations of various methods to couple a computerized ball device which acts as a mobile computing device to project towards waveguide eyeglasses or contacts which will then allow a user to view their world in a mixed reality, augmented reality, and virtual reality world and to allow for group collaboration on a shared coupled device. The device additionally has the ability to be docked in a drone cradle which creates a database map of the user's environment while not being utilized by the user for an immediate task. The device may also be attached to a wrist band for mobility. The device decouples the traditional design of head mounted virtual and mixed reality wherein the traditional design places the camera or central processing unit ("CPU") addition to the standard eyeglass which then violates human social contracts or concern the user or nearby bystanders are being recorded. The mobile computer ball device is decoupled from the waveguide lens so that a third person view of the user can be obtained in addition to a first person view. The computerized ball device allows standard shape eyeglasses to be coupled with the device in both a private user to ball setting or a device (ball) to private group setting. The device is superior in design to existing implementations of mixed and virtual reality technology with bulky head mounted apparatus which add weight that disturbs social contracts and bio-mechanical movement and weight distribution and does not allow for both first person and third person view points in the waveguide display. Family use of the technology allows for natural sharing of a coupled group technology sharing of experience. Commercial and Industrial work team use of the technology allows for natural sharing of a coupled group sharing of technology experience. The technology is a superior implementation of the way humans collaborate and work in groups. The technology is a superior implementation to extend natural human interaction without drawing attention to the technology instead of the shared human experience. Current technology deployment for computerized devices has focused on individual experience at the expense of group interaction. The implementation of the computerized ball device with head mounted eyeglass experience allows for a superior group experience. The computerized ball device may be placed in a mutual group setting or alternatively docked on a drone that has the ability to map a database of the user's environment. The computerized ball device has both an internal server and CPU as well as network connection capability to interface with a remote application server.

Description of the Related Art

The following descriptions and examples are not admitted to be prior art by virtue of their inclusion within this section.

Current implementations of mixed reality, augmented reality and virtual reality computing devices generally have bulky head mounted variations which are tailored to the individual experience and that experience generally isolates human beings from interacting face to face with other human beings. Such examples of these technologies are those implemented by Microsoft and their HaloLens product (A Trademark of Microsoft, Inc.), Oculus Rift VR (A Trademark of Facebook, Inc. by assignment), Sony's PlayStation VR (A Trademark of Sony, Inc.), HTC Vive (A Trademark of HTC, Inc.), Google Glass (A Trademark of Google, Inc.), Samsung's Gear VR (A Trademark of Samsung, Inc.), Razer's OSVR (A Trademark of Razer, Inc.) or Magic Leap's proposed systems (A Trademark of Magic Leap, Inc.). While these technologies are very impressive and useful, they fall short of allowing humans to interact in groups, face to face while using the technology without violating traditional human social contracts. Clearly these technologies stand the promise of greatly improved human productivity, but it has also come at a great expense of isolating humans from natural shared face to face interaction. Humans have rejected the model of a camera on the eyeglasses because others are concerned they are being recorded or watched. Some proponents of the camera on the eye glass model argue that humans will gain such benefit that the cost of objection for being recorded will be overwhelmed by the tremendous benefits of the technology. Further objections have become apparent because others in a group are not able to share the same information which creates a barrier of unfair information advantage. The implementation of the method allows users to "group" or "pair" multiple sets of eyeglasses with a single ball mobile computing device. The "group" or "paired" user experience allows all users in a group comfort in the social setting because everyone in the group is able to share the same information thus no social contract has been violated such as the objection to others recording a user without permission. While customization of user experience is useful for an individual experience, the implementations of technology have decreased the skills of humans to interact with eye to eye contact which has limited the ability to maintain or improve non-technology dependent human communication skills. Prior art generally has limited the ability to user both first person and third person viewpoints simultaneously.

Implementations of methods have been made in systems that provide augmented or virtual reality experiences, but do so in a manner that violates traditional human social contracts:

1) U.S. Pat. No. 8,930,490 issued Jan. 6, 2015 to Apple Inc. covers a method and system for collecting information, enriching the collected information and linking the enriched information that is provided. The system includes an application server as well as wearable smart glasses to process data. System item 1740 pertains to a video/audio capture device on the wearable glasses. The system and method proposed continues to violate the social contract between humans that does not generally allow for recording of each other. Further we propose an alternative that only allows recording by one device where all private group users have access to the same information to avoid the "are you recording me syndrome" as well as reducing information advantage bias in group settings. A common group device will allow a superior collective outcome for group settings where technology is utilized. Again, most of these forms are more awkward and do not flow well with biomechanical movements of the user.

2) U.S. Pat. No. 8,570,244 issued Oct. 29, 2013 to Sony Corporation, covers systems and methods for a head mounted image display apparatus. The image forming device is an optical system converting light emitted from the image forming device into parallel light. The implementation of this system and method does not pair the device for a private group, it does not transmit light images to the retina, it is bulky and it does not have the power to have a stronger CPU lens to project high definition images to multiple users. Further the device is incapable of remote database mapping of the user's environment. Again, most of these forms are more awkward and do not flow well with biomechanical movements of the user.

3) US Patent No. 20140098009 issued Dec. 10, 2013 to Prest, Tang, Evans, et al. covers methods and apparatus for a personal goggle system for presenting a personal display of media. The implementation of this method uses not only a bulky head mounted apparatus, but also is designed for personal or private viewing with minimal consideration for the group which then violates social contracts of acceptability. Again, most of these forms are more awkward and do not flow well with biomechanical movements of the user.

4) US Patent Application No. 2015/0016777 A1 to Abovitz et al, covers a planar waveguide apparatus with diffraction elements and system employing the same. The implementation of this method is substantially different in the configuration of the head mounted apparatus and planar waveguide, but also the configuration of the cameras and projection system. This system is not capable of mutually implementing first person and third person omniscient perspectives independently and simultaneously as the user's option. This system does not feature a locking mechanism for multiple users to share the same view which creates a barrier of asymmetric information in communication and recording of the common user environment for a plurality of users. Because the system does not allow a plurality of users to share the common recorded environment in a mutual design of trust, the system continues to violate social contracts of trust where humans object to being recorded. Because the systems and methods do not include both first person and third person omniscient perspectives where the full presence of the user's physical representation is not a part of the environment and the content does not provide artificial intelligence feedback from the user to interact with the content displayed in the waveguide, the system is not capable of an integrated augmented reality feedback experience and iterative reality experience. Users are not able to be a musician in the music band and receive visual and audio interaction with the actual musical band which the proposed invention does accomplish. Users are not able to be an actor or actress in the movie or TV show and receive audio and visual interaction with the movie stars and television stars which the proposed invention does accomplish. The proposed invention not only changes the way we experience current services such as cooking lessons, athletic training lessons, movies, music and other experiences, but it allows the user both the first person as well as third person omniscient perspectives and feedback from other objects or humans in the augmented environment.

SUMMARY

Current systems of technology to integrate computing into everyday life have largely been accepted when human users can trust the other users of the technology. The isolated nature of CPU, desktop, laptop or mobile computing is accepted because it remains obvious if one user is recording another user and typically this is forbidden in standard social settings because it violates a human social contract of trust between each other. Innovations such as Google Glass or Microsoft HaloLens or other augmented or virtual reality devices have struggled with adoption because they violate social contracts between humans and breach trust between humans. Information is power and if humans know they have different levels of power, they will typically not interact freely. This problem has caused a rift to form between humans and humans with technology. Further, augmented and virtual reality requires mapping a user's environment so that the virtual objects can interact with real objects that have been mapped into a database. Implementations of methods thus far have introduced non-sharing technologies which then pit one user against another user in turn causing low levels of adoption and violate human social contracts of trust. Lastly, implementations of methods and systems thus far have dealt with the first person perspective rather than the proposed invention which allows the first person and third person omniscient perspective, which, alongside methods and systems of artificial intelligence iterative feedback, the ability for a user to not only listen to music, but be part of the band, it allows not only the ability to watch a movie, but to be in the movie alongside existing actors and actresses, it allows not only the ability to watch a lesson in cooking or music or athletics, but to be alongside the teacher or instructing professional in an augmented or mixed reality environment.

The invention of systems and methods to accelerate the adoption of mixed reality, augmented reality and virtual reality is directed towards a mobile computing ball device that pairs with standard shaped eye glasses or contacts. The mobile ball device has the ability to project light and record/map environments while pairing to other users in a private group. The shared device has the function of building social contract trust so that users can equally build the groups information advantage rather than destroying group trust because the technology is potentially being used against a group member creating biased or skewed information advantage. The shared device also has the functional ability to display a first person or third person omniscient perspective with artificial intelligence iterative feedback, for a user to not only listen to music, but be part of the band, it allows not only the ability to watch a movie, but to be in the movie alongside existing actors and actresses, it allows not only the ability to watch a lesson in cooking or music or athletics, but to be alongside the teacher or instructing professional in an augmented environment, it allows not only the ability to invent something, but to be alongside the inventor or mentor in an augmented or mixed reality environment.

A plurality of users is communicatively paired with the device for group interaction settings. The plurality of users can command the device independently for the benefit of the private group. Accordingly, a plurality of users is then connected to the local or remote application server through the ball device. The ball CPU and application host or network server then connects users to a plurality of application functions. The ball CPU device is not only capable of pairing users to transmit data and electromagnetic light to users, but it also maps the user's environment for interaction with the application server. Users may use the device privately as one would use a mobile smart phone or they may pair with other users for group purposes to ease social contract stress. Shared or private applications may include but are not limited to calendar, photos, camera, videos, maps, weather, credit cards, crypto currency, notes, clocks, music, application hosting servers, settings, physical fitness, news, video conferencing, hologram conferencing, home security, home lighting, home watering systems, home energy or temperature settings, home cooking, phone, texting services, mail, internet, social networking, blogs, investments, books, television, movies, device location, flashlights, music tuners, airlines, transportation, identification, translation, gaming, real estate, shopping, food, commodities, technology, memberships, applications, web applications, audio media, visual media, touch media, general communication, internet, etc. . . . .

In one embodiment of the invention, the application server uses artificial intelligence algorithms to more efficiently provide the user with services or applications that are needed after the device has scanned the common area for the group or private user who has been paired with the device. The application server will display through the ball device most frequently used applications as well as recommending more efficient application for data patterns of the user or group of users.

In another embodiment of the invention, the application server uses artificial intelligence to analyze the user's biomechanical movement for such exercises as athletics, music, performing arts, cooking, teaching, conferencing etc. The visualization allows both the first person and third person omniscient perspective because of the positioning of the camera and projection relative to the waveguide lens. The ball CPU device will then be able to provide the user of the CPU ball device with an augmented reality companion to teach them. The augmented reality companion may be a professional at the service such as but not limited to tennis with John McEnroe or football with Nick Sabin or cooking with Julia Child or piano with Beethoven or acting alongside Harrison Ford in Star Wars or singing alongside Carrie Underwood on stage or in a private performance or many other examples. The ball CPU device will be able to analyze the user's movements and provide customized feedback and interaction with other projected human holograms and objects based on artificial intelligence inherent in the augmented reality system.

In another embodiment of the invention, the ball CPU device is docked on a drone that will then transport the device within a fixed set radius of the user to scan the associated area of the user into a database. The drone docked CPU ball has the ability to scan the user's area and navigate hallways, stairways, rooms, and outside places within a fixed radius of the user as well as the user's movements. The application server that the ball CPU device accesses locally or remotely will then be able to draw upon the database to speed processing times and reduce memory leak.

In another embodiment of the invention, multiple users who each have the CPU ball or cube device may lock the other devices to a common group share over a network if a group of users is working together. These bounded group lock features are in place to build technology trust amongst users while not violating human social contracts. This implementation allows for all users to experience the common recording in their viewing through the planar waveguide lens to disallow asymmetric information which violates human social contracts of trust.

In another embodiment of the invention, reflective light and electromagnetic waves are projected from the CPU ball device onto the eyeglasses then from the eyeglasses through the aqueous humor lens and vitreous humor which then project onto the photo receptors of the retina. The projected images to provide the augmented reality experience reside within the structures at reactive variable depths of the eyeglasses or contact lenses. The impulses then synapse with the optic nerve to transmit images to the brain. Adjustments to the pupil and lense allow for the adjustment of light transmission to the retina. These features augment the users visual experience from not only the natural world but also the CPU ball generated objects to make a mixed reality or augmented reality experience.

People use eye glasses or contacts because the cornea and the length of the eye are often mismatched. The name for the mismatch is correlation error in optometry. When one is near sighted the cornea does not project all the way back to the retina and when one is far sighted the image is projected too far past the retina. Glasses to correct near sightedness are thinner in the middle and thicker on the edges which allows light to diffuse and diverge and project images further back toward the retina. To correct far sightedness, the glasses are thicker in the middle and thinner on the edges which allows for light to converge more quickly and the images are brought in further to project onto the retina accurately which allows for focus. More or less glasses "trick" the eye by moving the light toward different focal points.

Coherent laser light and electromagnetic waves are projected from the mobile CPU ball. Refracted images from light transmission into the structures in the glasses or contacts make the holographic images inside the contacts or eyeglasses. Refraction allows for the laser image that is projected to the head mounted eye glasses or contacts to be properly transmitted to the optic nerves for interpretation.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Figure 1:
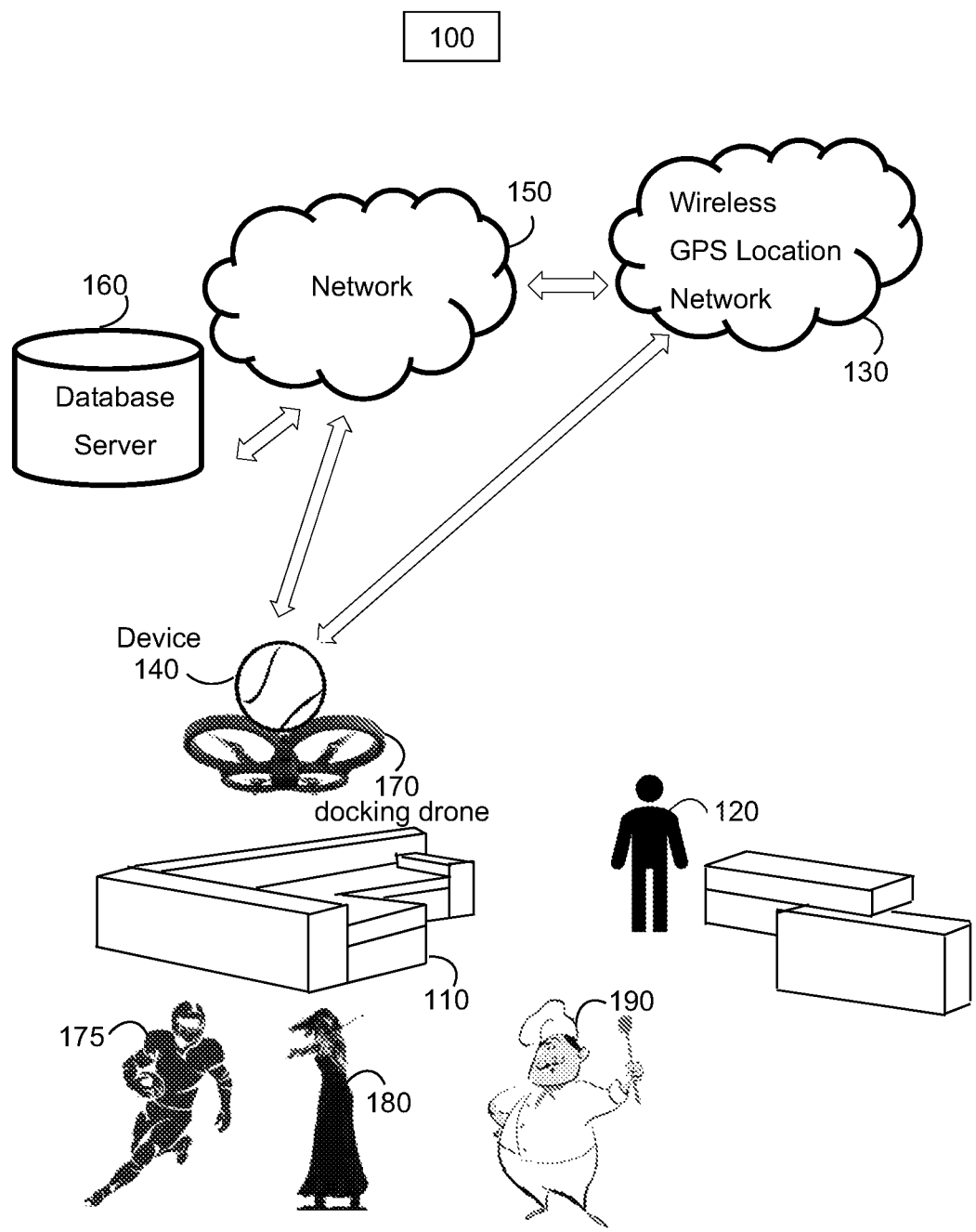
FIG. 1 illustrates a schematic diagram of the mobile CPU networked ball projection device mapping the current location environment with the drone docking station. The mobile CPU networked ball device may also project images of virtual companions to facilitate dialogue, analysis or teaching to the user from both a first person and third person omniscient perspective.

The following paragraphs provide a brief summary of various techniques described herein such as illustrated in FIG. 1. In one implementation as illustrated in FIG. 1 the ball CPU device 140 is mounted on a drone charging base 170. The ball CPU device 140 may gather preliminary information to complete and transmit a map tile database 160 utilizing the wireless network 150 and wireless GPS location network 130 of the user's environment from a fixed radius from the user 120. The map tiles from the database server 160 are then transferred to the ball CPU device 140 on a wireless network 150 from the database server 160. The CPU ball device 140 only utilizes map tiles in the immediate user 120 radius to optimize memory leak. The users 120 environment is periodically scanned for change analysis to the map tiles by the ball CPU device 140 and 170. Images may also be projected by laser light to the user 120. The images could be but are not limited to an athlete 175 or a musician 180 or a chef 190 or another service user that would then act as a virtual companion to the user 120 in their display device.

Figure 2:
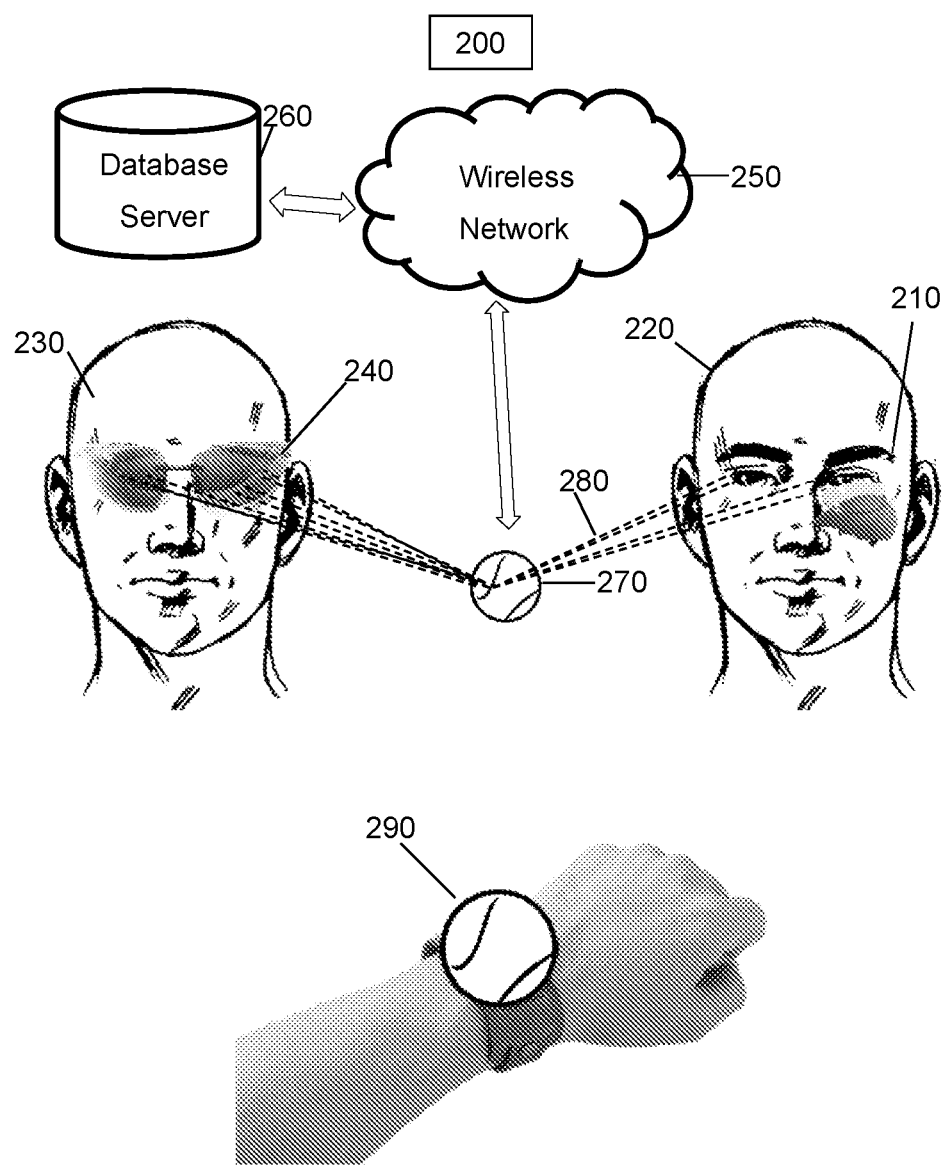
FIG. 2 illustrates a schematic diagram of implementations of methods considering pairing multiple users so that social contracts of trust are not violated and a schematic of the wrist band to which the mobile CPU networked ball may be attached.

The embodiment illustrated in FIG. 2 illustrates how multiple users are paired so that human social contracts of trust are not violated and projected images are shared rather than consumed by a single user 230 to create asymmetric information with user 220. The user 230 may call the ball CPU device 270 to a centrally accessible common area with the user 230 or a group of users 230 and 220 for use with head mounted waveguide glasses 240 or contacts 210 which act as planar waveguides for the laser and infrared light 280 which is transmitted from the ball CPU device 270 to the head mounted glasses 240 or contacts 210. The ball CPU device may then transmit laser light 280 and infrared light 280 to the head mounted waveguide apparatus 240 or 210 which facilitates the visualization of embedded photon structures in the waveguide. Another benefit of the separation of the ball CPU 270 from the head mounted glasses 240 or contacts 210 is that Network and radiofrequency waves are further away from the head mounted waveguide therefore there is a reduction of radiofrequency and heat exposure of the electronics with the brain tissue. Additionally, the user 230 may attach the CPU ball 270 to a wrist mounted configuration 290 for mobility. Further, if users 230 and 220 agree to pair with the CPU ball 270, then the system only allows users to see the same information which adds trust to the overall system and use of the technology to ease societal social contract trust burdens which are violated when another user has reason to believe that they are being recorded.

Figure 3A:
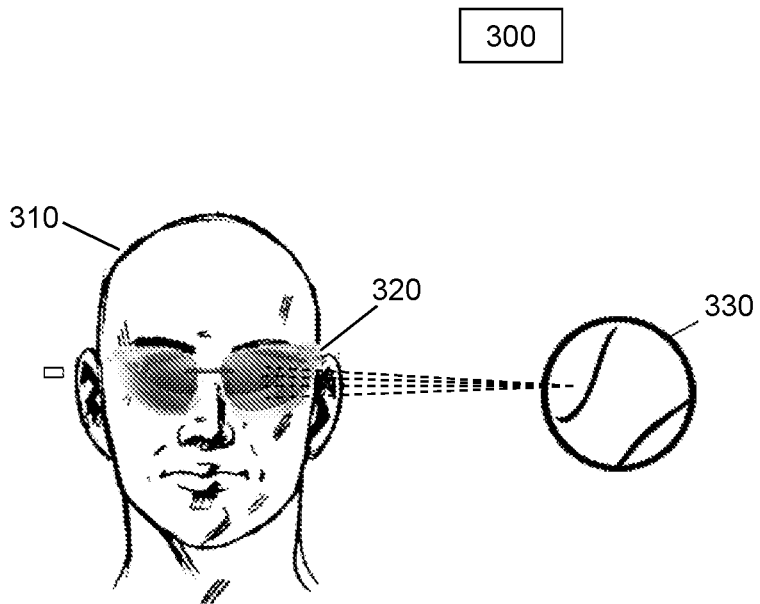
FIGS. 3A and 3B illustrate a schematic diagram of implementations of methods considering the separation of the ball device from the breakable head-mounted glasses which increases the technological capability while increasing durability and reducing stress from adding technology near the head which decreases biomechanical movement and balance as well as adding unwanted magnetic and radio waves near the brain.

The embodiment illustrated in FIG. 3A illustrates the network based ball CPU device 330 projecting laser light and infrared light 370 to the users 310 head mounted glasses 320 or contacts 320.

Figure 3B:
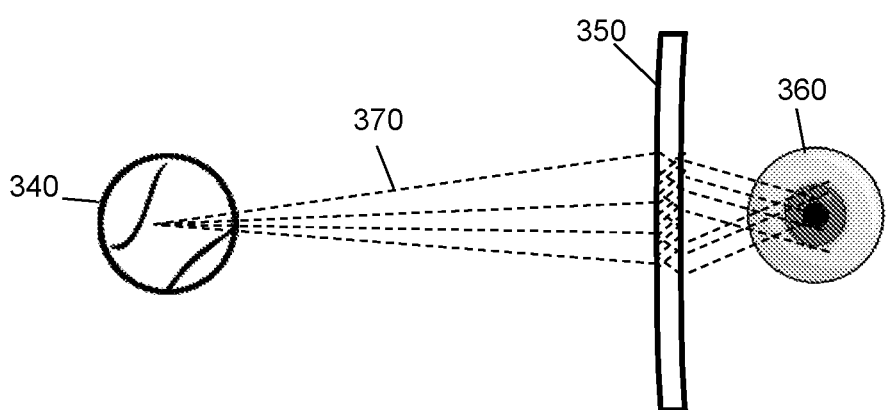

The embodiment illustrated in FIG. 3B illustrates the mobile network based ball CPU projection device 340 projecting laser light and infrared light 370 to the head mounted glass or contact lens 350. FIG. 3B shows a side view of the lens 350 taken from the front view if FIG. 3A glasses or contacts 320. Laser light and infrared light is refracted internally in 350 to project holographic images inside the lens 350 such that the user's eye 360 can interpret the images against the real world from both a first person and third person omniscient perspective.

Figure 4A:
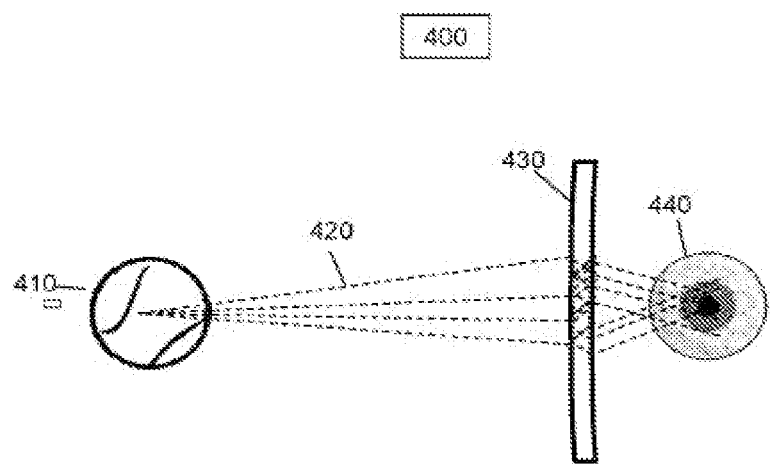
FIGS. 4A and 4B illustrate in further detail the holographic images inside the eyeglass or contact lens structures projected from the mobile networked CPU ball. Refraction allows for the augmented reality hologram to be seen by the user against the real physical world from both a first person and third person omniscient perspective.
Figure 4B:
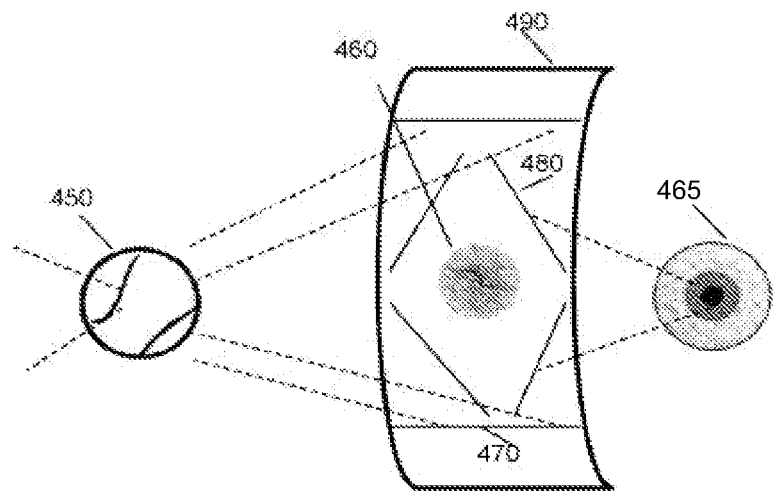

The embodiment illustrated in FIG. 4A illustrates the same embodiment as FIG. 3B, but is repeated so it can be compared and expanded for the purposes of FIG. 4B which expands the explanation and the physical mechanics of light refraction to the user's eye 440.

The embodiment illustrated in FIG. 4B illustrates the infrared and laser light projecting from the wireless network based CPU ball 450 in greater detail as it moves through the waveguide lens 490 to project the hologram 460. Again, laser light and infrared light are projected from the wireless network based CPU ball to the lens 490 where light is refracted by structures 480 within the lens 490 that then project the holographic image 460 to the user's eye 465. Both structures 470 and 480 allow for refraction to project the hologram to the user's eye 465 within the lens structure 490. Many of these structures are present within the lens 490 so that the user may change the angles as which they look at both the real world and holograms 460 against the real world.

The embodiment illustrated in FIG. 4B further illustrates the use of the infrared light and laser light transmission in sequence with the users eyeball 465. The laser light and infrared light may scan the users eyeball 465 to recognize the user for purposes of identity security.

The embodiment illustrated in FIG. 4B could be any object 460 hologram such as but not limited to a word processor application, spreadsheet application, presentation application, keyboard, voice activated assistant, voice activated recorder, productivity application, movie application, music application, health application, companion chef instructor, companion to talk with who is remotely connected through network chat or messaging or video text, companion personal coach, companion athletic trainer, companion music or performing arts instructor, companion reading application, companion writing application for authors, companion personal trainer, or any personal instructor of any type that performs analysis through the camera in the ball CPU device 450 that transmits user 310 movements for analysis to the wireless network 250 and database server 260. The database server 260 and wireless network 250 can then transmit analysis from the database server or processors in the database server 260 or CPU ball device 450 to then project a holographic image 460 to the user 310 for interaction, companionship, and self-improvement or analysis.

Figure 5A:
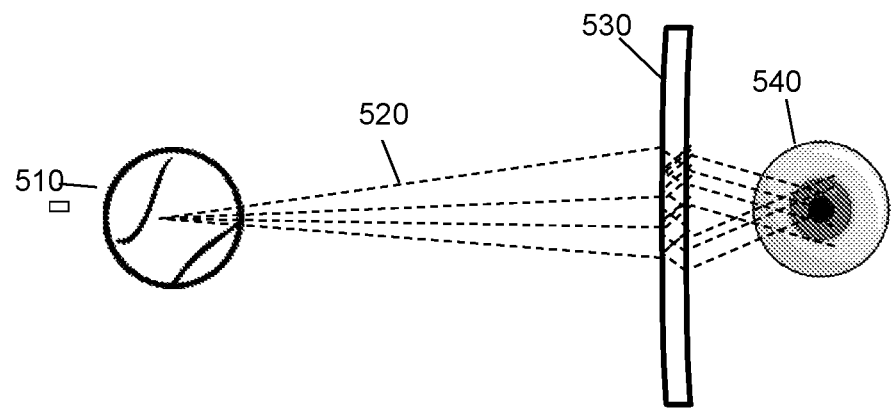
FIGS. 5A and 5B illustrate a schematic diagram of the implementation of methods from the system of the user's projected image to allow the user to visualize both a first person and third person omniscient augmented interactive artificial intelligence iterative environments where the users not only are able watch the band or musical performing artist but also may participate in the band as a singer, drummer, guitar player or other instrument player with interaction such that the user is a band member.

The embodiment illustrated in FIG. 5A illustrates the mobile network based ball CPU projection device 510 projecting laser light and infrared light 520 to the head mounted glass or contact lens 530. Laser light and infrared light and electromagnetic waves are refracted internally in the lens 530 to project holographic images inside the lens 530 such that the user's eye 540 can interpret the images against the real world from both a first person and third person omniscient perspective.

Figure 5B:
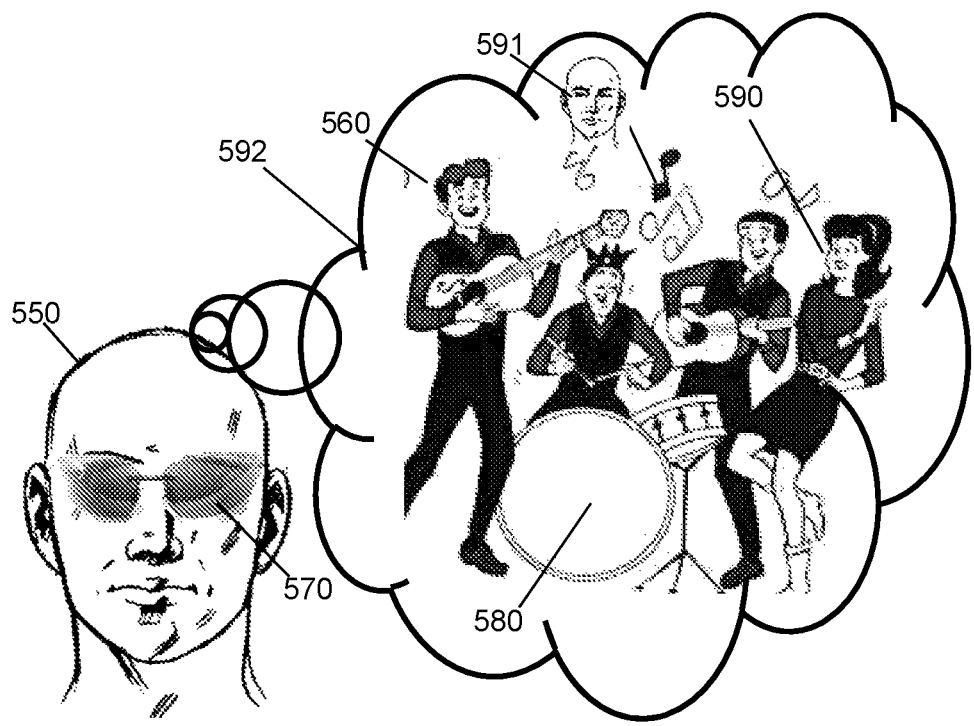

The embodiment illustrated in FIG. 5B illustrates a schematic diagram of the implementation of methods from the system 510 and 570 of the user's projected image 560 to allow the user 550 to visualize both a first person 550 and third person omniscient 592 augmented interactive artificial intelligence interactive environments where the users 591 and 590 not only are able watch the band or musical performing artist but also may participate in the band as a singer 591, drummer 580, guitar player or other instrument player with interaction such that the user 591 is a band member. The artificial intelligence of the system 510 and methods will change music from an observed experience to an immersive and participatory experience with a plurality of users 591 and 590. The artificial intelligence content allows for a variety of endings or paths based on the user's interaction with the existing content. The camera 1113 also allows for the user 550 to record the music with the user 550 in the band for posting to social media or other local or cloud based networks subject to copyright laws.

Figure 6A:
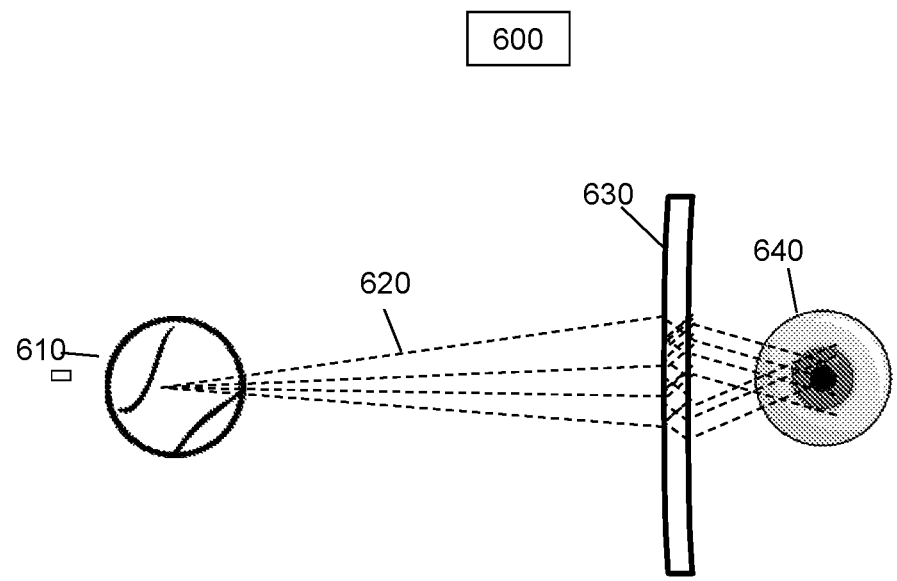
FIGS. 6A and 6B illustrate a schematic diagram of the implementation of methods from the system of the user's projected image to allow the user to visualize both a first person and third person omniscient augmented interactive artificial intelligence iterative environments where the users not only are able to watch the movie or performing artist but also may participate in the movie as an actor or actress, with interaction such that the user is a band member.

The embodiment illustrated in FIG. 6A illustrates the mobile network based ball CPU projection device 610 projecting laser light and infrared light 620 to the head mounted glass or contact lens 630. Laser light and infrared light and electromagnetic waves are refracted internally in the lens 630 to project holographic images inside the lens 630 such that the user's eye 640 can interpret the images against the real world from both a first person and third person omniscient perspective.

Figure 6B:
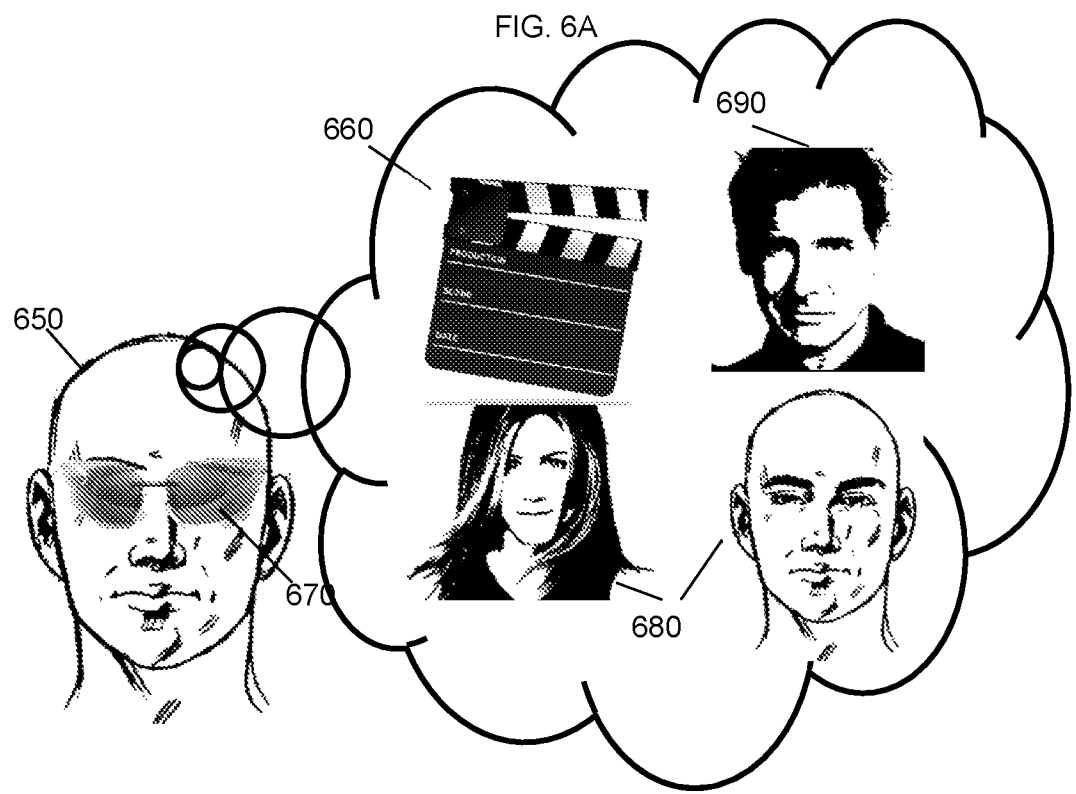

The embodiment illustrated in FIG. 6B illustrates a schematic diagram of the implementation of methods from the system 610 and 670 of the user's projected image 680 to allow the user 650 to visualize both a first person 650 and third person omniscient 680 augmented interactive artificial intelligence interactive environments where the users 650 and 680 not only are able watch the movie 660 or performing artist but also may participate in the movie as an actor 690 or actress 680, with interaction such that the user 650 is an actor or actress in the movie or theatrical production. The artificial intelligence of the system 610 and methods will change movies and theatrical arts from an observed experience to an immersive and participatory experience with a plurality of users 680 and 690. The artificial intelligence content allows for a variety of endings or paths based on the user's interaction with the existing content. The camera 1113 also allows for the user 680 to record the movie with the user 680 in the movie for posting to social media or other local or cloud based networks subject to copyright laws.

Figure 7A:
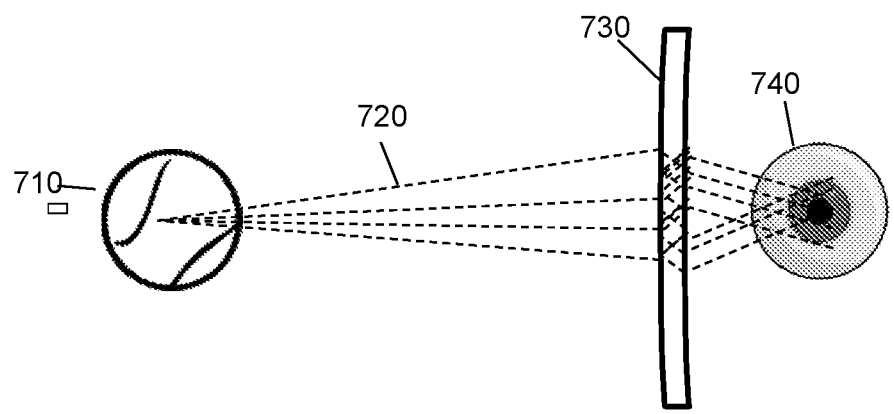
FIGS. 7A and 7B illustrate a schematic diagram of the implementation of methods from the system of the user's projected image to allow the user to visualize both a first person and third person omniscient augmented interactive artificial intelligence iterative environments where the users not only are able to watch the chef or cook but also may participate in the cooking experience, with interaction such that the user is a chef.

The embodiment illustrated in FIG. 7A illustrates the mobile network based ball CPU projection device 710 projecting laser light and infrared light 720 to the head mounted glass or contact lens 730. Laser light and infrared light and electromagnetic waves 720 are refracted internally in the lens 730 to project holographic images inside the lens 730 such that the user's eye 740 can interpret the images against the real world from both a first person and third person omniscient perspective.

Figure 7B:
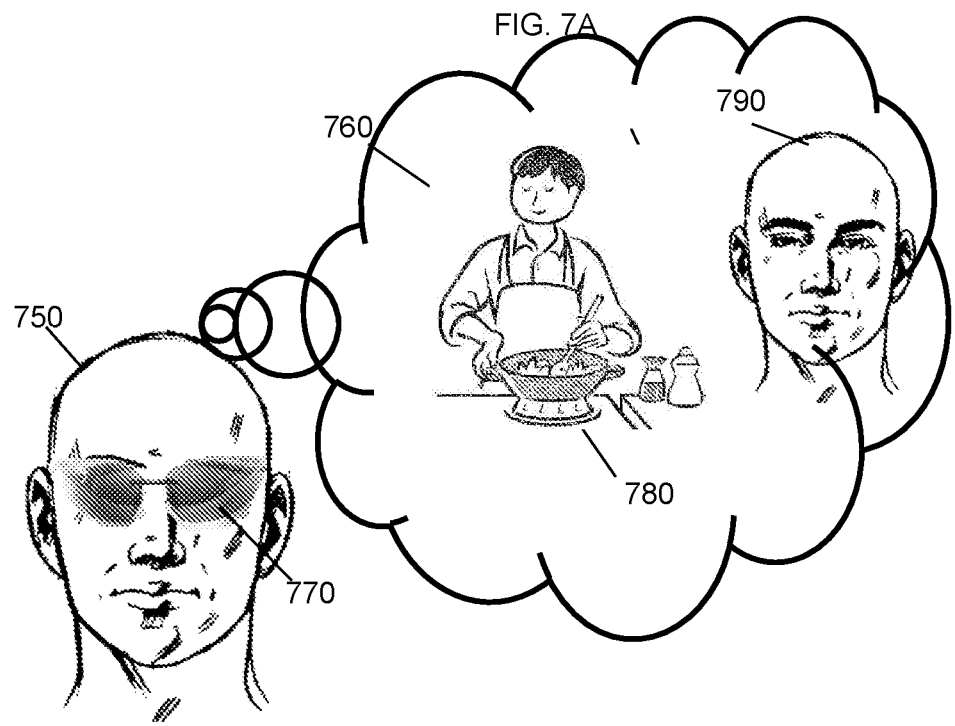

The embodiment illustrated in FIG. 7B illustrates a schematic diagram of the implementation of methods from the system 710 and 770 of the user's projected image 760 to allow the user 750 to visualize both a first person and third person omniscient augmented interactive artificial intelligence interactive environments where the users 790 not only are able to watch the chef 780 or cook 780 but also may participate in the cooking experience 760, with interaction such that the user is a chef 780. The artificial intelligence of the system 710 and 770 and methods change cooking instruction 780 from an observed experience to an immersive and participatory experience with a plurality of users 750 and 790. The artificial intelligence content allows for a variety of endings or paths based on the user's interaction with the existing content and other users. The camera 1113 also allows for the user 790 to record the cooking experience with the user 790 in the cooking experience for posting to social media or other local or cloud based networks subject to copyright laws.

Figure 8A:
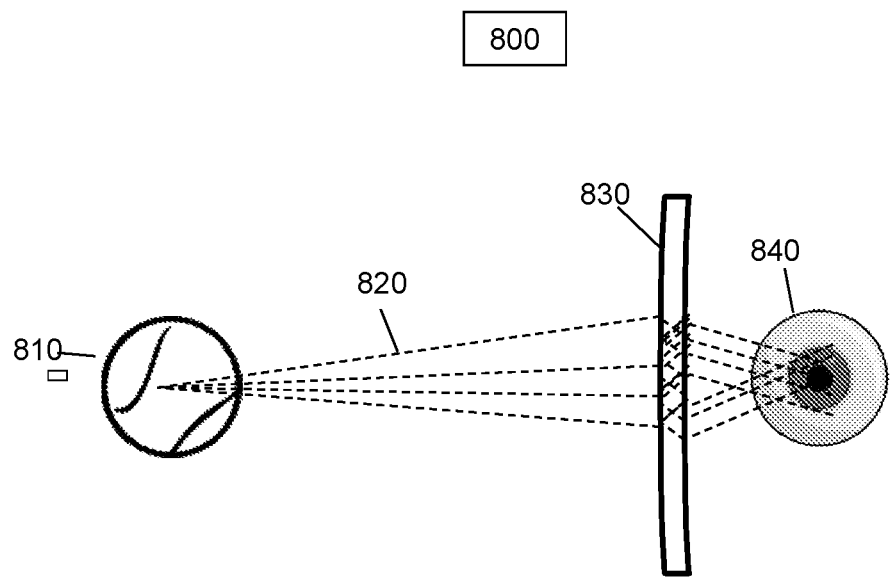
FIGS. 8A and 8B illustrate a schematic diagram of the implementation of methods from the system of the user's projected image to allow the user to visualize both a first person and third person omniscient augmented interactive artificial intelligence iterative environments where the users not only are able to watch the author or reader read but also may participate in the story telling experience, with interaction such that the user is a co-story teller or author.

The embodiment illustrated in FIG. 8A illustrates the mobile network based ball CPU projection device 810 projecting laser light and infrared light 820 to the head mounted glass or contact lens 830. Laser light and infrared light and electromagnetic waves 820 are refracted internally in the lens 830 to project holographic images inside the lens 830 such that the user's eye 840 can interpret the images against the real world from both a first person and third person omniscient perspective.

Figure 8B:
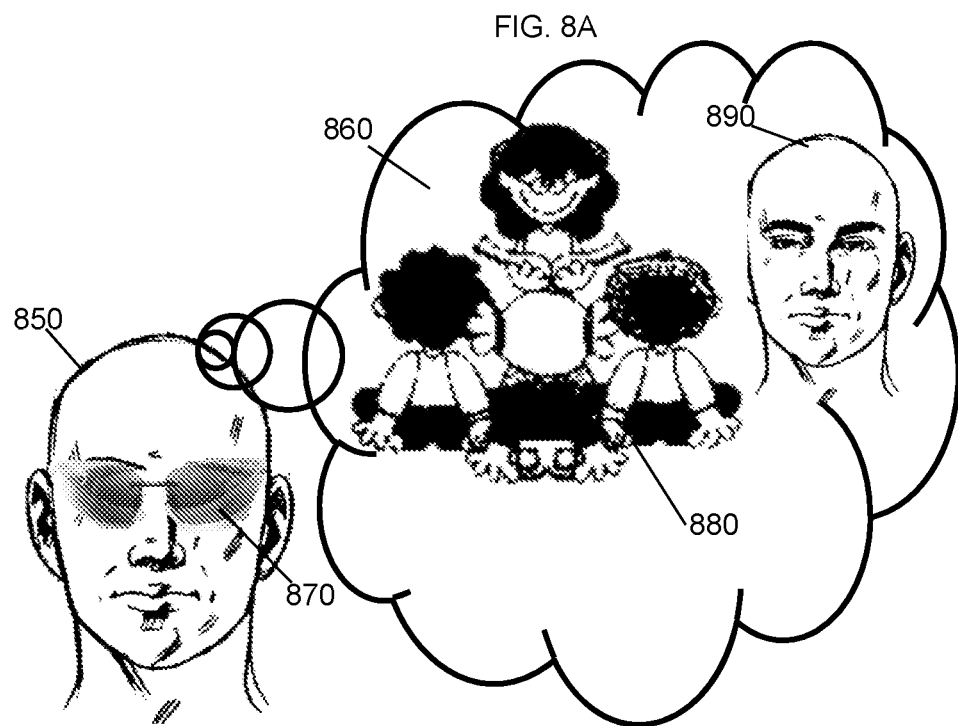

The embodiment illustrated in FIG. 8B illustrates a schematic diagram of the implementation of methods from the system 810 and 870 of the user's projected image 860 to allow the user 850 to visualize both a first person and third person omniscient augmented interactive artificial intelligence interactive environments where the users 890 not only are able to watch the author 880 or reader 880 read but also may participate in the story telling experience 860, with interaction such that the user 850 is a co-story teller or author 890. The artificial intelligence of the system and methods will change reading from an observed experience to an immersive and participatory experience with a plurality of users. The artificial intelligence content allows for a variety of endings or paths based on the user's interaction with the existing content. The camera 1113 also allows for the user 890 to record the reading experience with the user 890 in the reading experience for posting to social media or other local or cloud based networks subject to copyright laws.

Figure 9A:
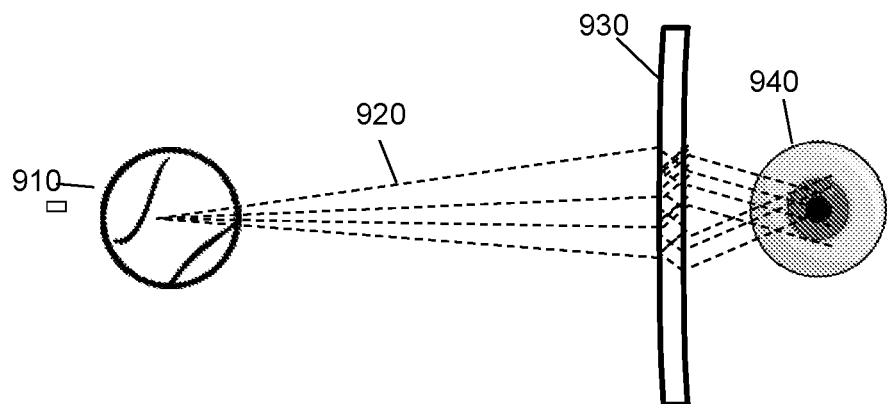
FIGS. 9A and 9B illustrate a schematic diagram of the implementation of methods from the system of the user's projected image to allow the user to visualize both a first person and third person omniscient augmented interactive artificial intelligence iterative environments where the users not only are able to watch the inventor, architect or educator but also may participate in the creative experience, with interaction such that the user is a co-inventor or architect or educator.

The embodiment illustrated in FIG. 9A illustrates the mobile network based ball CPU projection device 910 projecting laser light and infrared light 920 to the head mounted glass or contact lens 930. Laser light and infrared light and electromagnetic waves 920 are refracted internally in the lens 930 to project holographic images inside the lens 930 such that the user's eye 940 can interpret the images against the real world from both a first person and third person omniscient perspective.

Figure 9B:
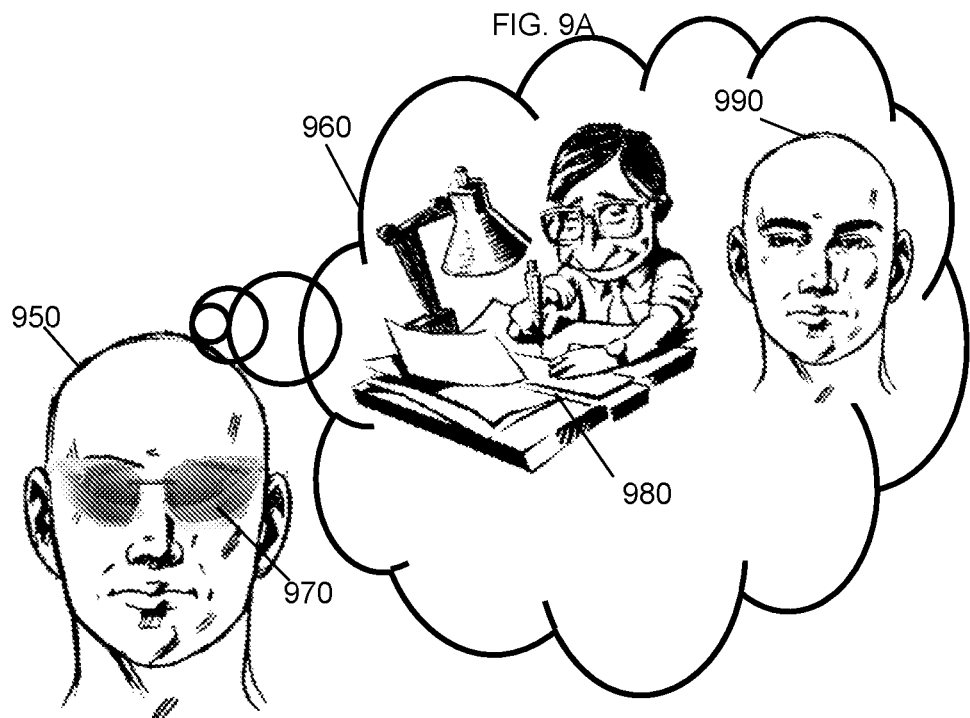

The embodiment illustrated in FIG. 9B illustrates a schematic diagram of the implementation of methods from the system 910 and 970 of the user's projected image 960 to allow the user to visualize both a first person and third person omniscient augmented interactive artificial intelligence interactive environments where the users 990 not only are able to watch the inventor 980, architect 980 or educator 980 but also may participate in the creative experience 960, with interaction such that the user 950 is a co-inventor or co-architect or co-educator 990. The artificial intelligence of the system and methods will change the creative process from an observed experience to an immersive and participatory experience with a plurality of users 990. The artificial intelligence content allows for a variety of endings or paths based on the user's interaction with the existing content. The camera 1113 also allows for the user 990 to record the co-invention or co-architect or co-educator with the user 990 in the co-invention or co-architect or co-educator for posting to social media or other local or cloud based networks subject to copyright laws.

Figure 10A:
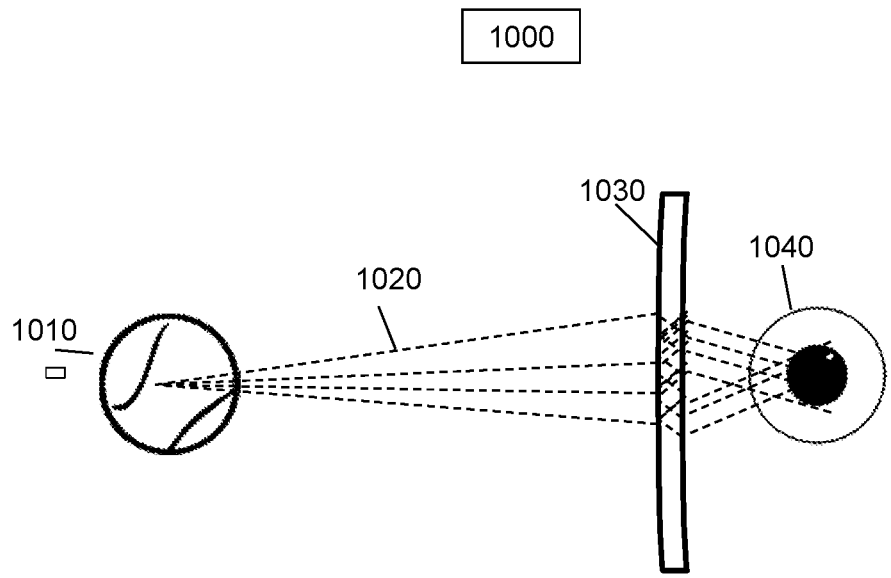
FIGS. 10A and 10B illustrate a schematic diagram of the implementation of methods from the system of the user's projected image to allow the user to visualize both a first person and third person omniscient augmented interactive artificial intelligence iterative environments where the users not only are able to watch the athlete or coach but also may participate in the sporting experience, with interaction such that the user is a participant.

The embodiment illustrated in FIG. 10A illustrates the mobile network based ball CPU projection device 1010 projecting laser light and infrared light 1020 to the head mounted glass or contact lens 1030. Laser light and infrared light and electromagnetic waves 1020 are refracted internally in the lens 1030 to project holographic images inside the lens 1030 such that the user's eye 1040 can interpret the images against the real world from both a first person and third person omniscient perspective.

Figure 10B:
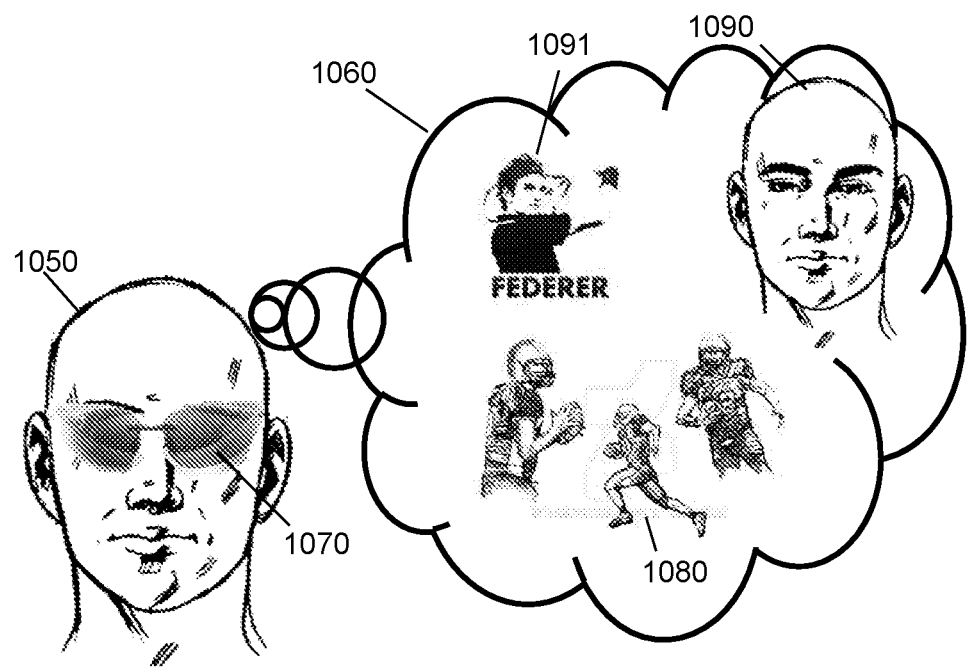

The embodiment illustrated in FIG. 10B illustrates a schematic diagram of the implementation of methods from the system 1010 and 1070 of the user's projected image 1060 to allow the user 1050 to visualize both a first person and third person omniscient augmented interactive artificial intelligence interactive environments where the users 1090 not only are able to watch the athlete 1091 or coach 1080 but also may participate in the sporting experience, with interaction such that the user 1090 is a participant. The artificial intelligence of the system and methods will change the video from an observed experience to an immersive and participatory experience with a plurality of users 1090. The artificial intelligence content allows for a variety of endings or paths based on the user's interaction with the existing content. The camera 1113 also allows for the user 1090 to record the sporting experience with the user 1090 in the sporting experience for posting to social media or other local or cloud based networks subject to copyright laws.

Figure 11:
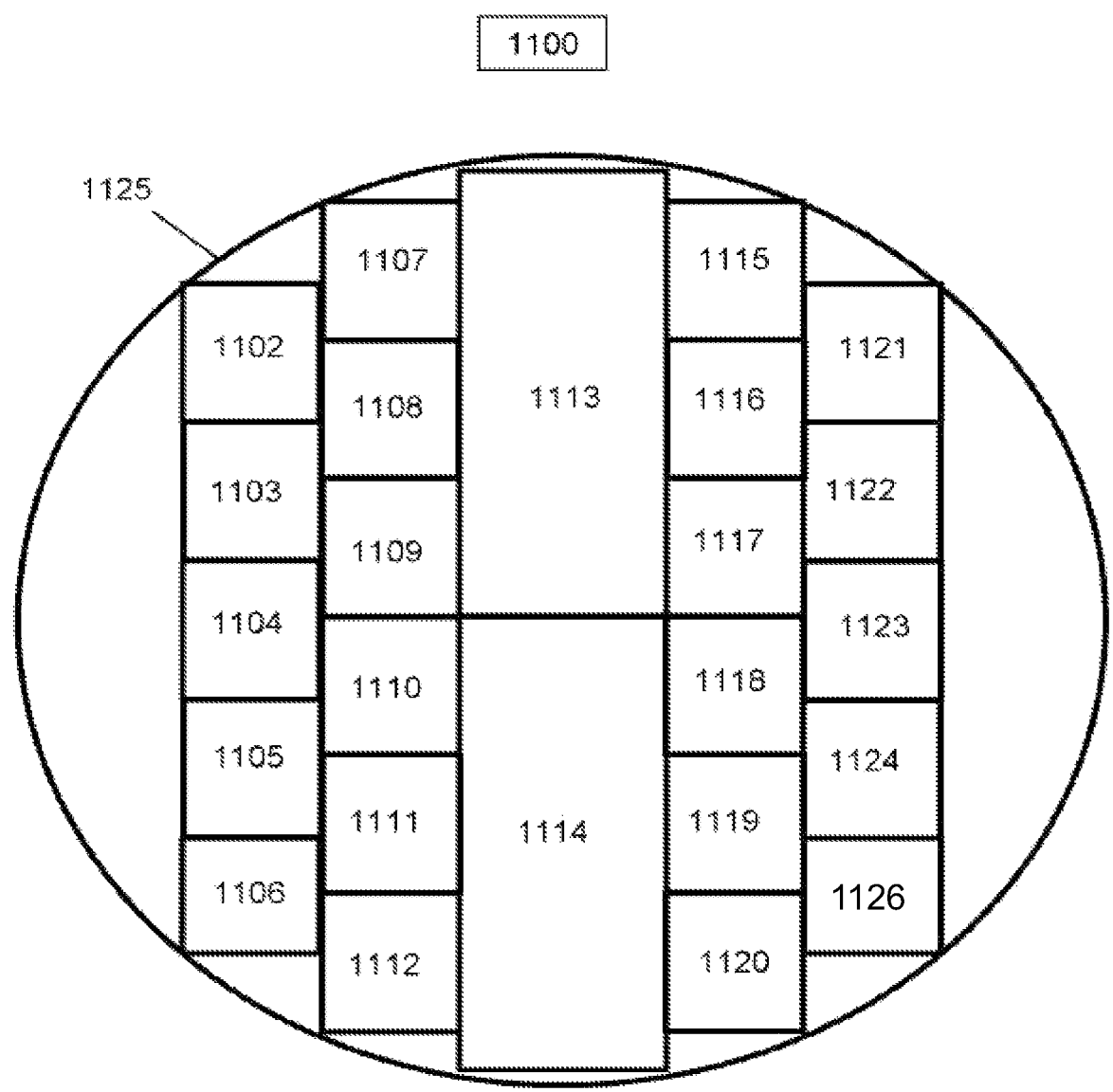
FIG. 11 illustrate a diagram of the mobile computer ball device in accordance with some embodiments.

The embodiment illustrated in FIG. 11 illustrates the mobile network based ball CPU projection device 1125. The device 1125 may include a memory 1102, a memory controller 1103, one or more processing units (CPUs) 1104, a peripherals interface 1105, RF circuitry 1106, audio circuitry 1108, one or more speakers 1107 and 1115, a microphone 1109, an input/output (I/O) subsystem 1110, input control devices 1111, an external port 1112, optical sensors 1116, camera 1113, one or more laser projection systems 1114, power supply 1117, battery 1118, wifi module 1119, GPS receiver 1120, accelerometer 1121, ambient light sensor 1122, location sensor 1123, barometer 1124, and USB port 1126. The device 1125 may include more or fewer components or may have a different configuration or arrangement of components The CPUs 1104 run or execute various instructions compiled by software and applications which are stored in the memory 1102 that perform various functions on the device 1125. The RF circuitry 1106 receives and sends RF signals. The RF circuitry 1106 converts electrical signals to/from electromagnetic signals and communicates with communications networks 150 and 130 and other communication devices via the electromagnetic signals. The RF circuitry may be comprised of but not limited to an antenna system, a tuner, a digital signal processor, an analogue signal processor, various CODECs, a SIM card, memory, amplifiers, an oscillator and a transceiver. The wireless communication components may use a plurality of standard industry protocols such as Global System for Mobile Communication ("GSM"), Voice over internet protocol ("VOIP"), long-term evolution ("LTE"), code division multiple access ("CDMA"), Wireless Fidelity ("WiFi"), Bluetooth, Post office Protocol ("POP"), instant messaging, Enhanced Data GSM Environment ("EDGE"), short message service ("SMS"), or other communication protocol invented or not yet invented as of the filing or publish date of this document.

The input/output subsystem 1110 couples with input/output peripherals 1105 and other control devices 1111 and other laser projection systems 1114 to control the device 1125. The laser projection system 1114 and camera 1113 take infrared tracking information feedback from the user 120 into the peripheral interface 1105 and CPU 1104 to combine the data with instructions in the CPU 1104 and memory 1102 that provide an iterative instruction for the graphical user interface which is displayed in the waveguide lens 240 or 210 after comparison with information in the memory from the database server 260. The input control devices 1111 may be controlled by user 120 movements that are recorded by the laser projection system 1114 and camera 1113. The input control devices 1111 may include instructions from the user 120 movements based on interactions with the graphical user interface module that is a hologram 460 in the waveguide lens 240 or 210. Holograms 460 may take the form of representations of such things as graphical user interface modules which represent virtual keyboards, voice recognition, translation services, physical buttons, dials, sliders, joysticks, video game controllers, physical sporting equipment 1091, user 1050, comparisons of the user 1050 to a professional athlete 1080 or inventor 980 or author 880 or chef 780 or actress 680 or actor 690 or a musician 590, fashion apparel designer 980, weapons, cooking utensils 780, musical instruments 580, microphones, tools, books 880, movies 660, music 580, ordering food 1360 or drink 1380 with geofence location services, or ordering clothing 1460 or 1490, ordering retail goods in a virtual store 1460 or 1490, comparing the user 1591 and 1590 to a professional athlete 1560 using artificial intelligence on the database server 160 through interaction with the device 140 through the wireless network 150 or 130, virtual shopping 1225, virtual restaurant drive thru 1224 or other equipment for completing tasks.

The audio circuitry 1108, one or more speakers 1107 and 1115 and the microphone 1119 provide an audio interface between the user and the device 1125. The audio circuitry 1108 receives audio data from the peripherals interface 1105, converting the data to an electrical signal, and transmits the electrical signal to the speakers 1107 and 1115. The speakers 1107 and 1115 convert the electrical signals to human audible sound waves which are mechanotransducted into electrical impulses along auditory nerve fibers and further processed into the brain as neural signals. The audio circuitry 1108 also receives electrical signals converted by the microphone 1109 from sound waves. The audio circuitry 1108 converts the electrical signal to audio data and transmits the audio data to the peripherals interface 1105 for processing. Audio data may be retrieved and/or transmitted to memory 1102 and/or the RF circuitry 1106 by the peripherals interface 1105. In some embodiments the RF circuitry may produce ultra-high frequency waves that transmit to wireless headphones which then convert the electrical signals to human audible sound waves which are mechanotransducted into electrical impulses along auditory nerve fibers and further processed into the brain as neural signals.

In some embodiments, the graphical user interface hologram objects 460, 592, 660, 760, 860, 960, 1060, 1360, 1492, 1592 and other objects and representations of humans or objects interact with the user 120 through the laser projection system 1114 and camera 1113 take infrared tracking information feedback from the user 120 into the peripheral interface 1105 and CPU 1104 to combine the data with instructions in the CPU 1104 and memory 1102 that provide an iterative instruction for the graphical user interface which is displayed in the waveguide lens 240 or 210 after comparison with information in the memory from the database server 260. Both a first person and third person omniscient perspective mode are available due to the remote separation of the camera 1113 and laser projection system from the waveguide lens 490. The user 1550 may compare their movement 1590 from a third person omniscient perspective to the movements of a professional athlete 1560. The artificial intelligence algorithms on the network 250 and database server 260 provide real time analytical feedback to the user 230 on the biomechanical motion differences between the user 1550 and professional athlete 1590.

The device 1125 also includes a power supply 1117 and battery 1118 for powering the various components. The USB port 1125 may be used for providing power to the battery 1118 for storage of power.

Optical sensors 1116 are used in conjunction with the camera 1113 and laser projection system 1114 to capture images and movements by the user 120 and its environment 110 to capture images or video. If other users 220 are near the user 230, both users may couple to the device 270 utilizing the laser projection system 1114, RF circuitry 1106 and optical sensors 1116 to allow both users 220 and 230 or a plurality of users to view the same digital projection which then reduces the technological problem of asymmetric information or the "are you recording me" syndrome and assimilates the technology into more common social conventions and unwritten trust contracts.

The location sensor 1123 couples with the peripherals interface 1105 or input/output subsystem 1110 to disable the device if the device 1125 is placed in a pocket, purse or other dark area to prevent unnecessary power loss when the device 1125 is not being used.

The device 1125 may also utilize data from an accelerometer 1121 to assist in the detection of user motion in addition to the infrared laser light projection system to more efficiently process the location of the user 120 in relation to the device 120 and other objects 660 projected by the laser light projection system 1114 to the waveguide lens 670.

The software instructions stored in the memory 1102 may include an operating system (LINUX, OS X, WINDOWS, UNIX, or a proprietary operating system) of instructions of various graphical user interfaces 592, 660, 760, 860, 960, 1060 or other variations which include instructions for object hologram embodiments of a calendar 1201, photos 1212, camera 1212, videos 1209, maps 1211, weather 1202, credit cards 1215, banking 1215, crypto currency 1215, notes, clocks 1213, music 1206, application hosting servers 1220, settings 1220, physical fitness 1203, news 1216, video conferencing 1209, home security 1208, home lighting 1208, home watering systems 1208, home energy 1208 or temperature settings 1208, home cooking 1207, phone 1214, texting services, mail 1218, internet 1217, social networking 1219, blogs 1219, investments 1210, books, television 1209, movies 1209, device location, flashlights, music tuners 1206, airlines 1205, transportation 1205, identification 1219, translation, gaming 1221, real estate 1208, shopping, food 1207, commodities 1215, technology 1217, memberships, applications 1220, web applications 1217, audio media 1206, visual media 1209, mapping or GPS 1211, touch media 1217, general communication 1214, internet 1217, mail 1218, contacts 1219, cloud services 1220, games 1221, translation services 1223, virtual drive through with geofence location services for nearby restaurants to allow advance ordering of food and payment 1224, virtual shopping with custom measurements through infrared scans 1225, etc. . . . and facilitates communication between various hardware and software components. Artificial Intelligence algorithms on the network 150 and database server 160 provide iterative analytical feedback to the user 120. Software applications are not limited to the aforementioned embodiments. The operating system includes various software components and/or drivers for controlling and managing general system tasks such as but not limited to memory management, storage device control, power management, etc. . . . )

Figure 12:
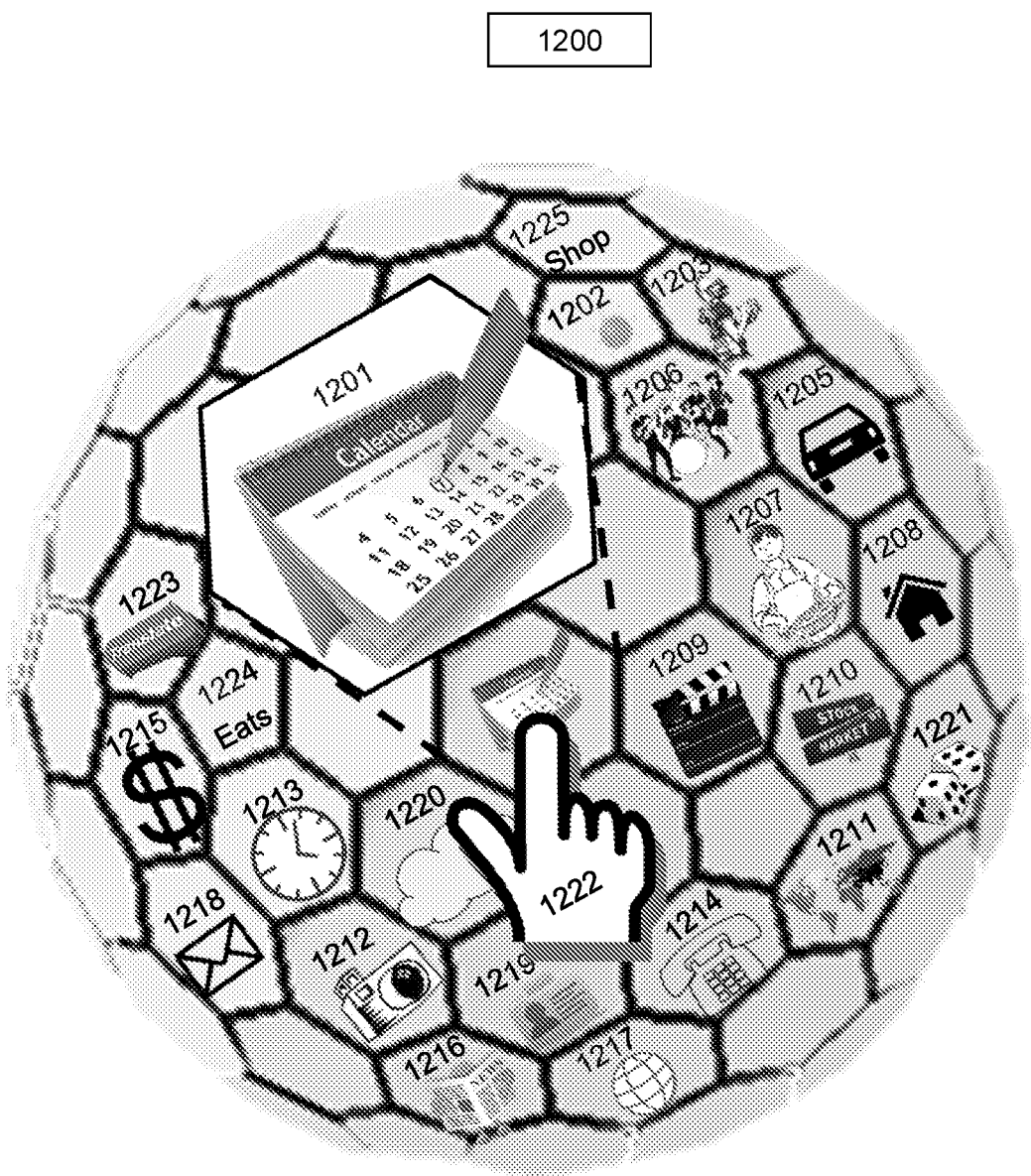
FIG. 12 illustrates an exemplary user interface for selecting a plurality of applications in accordance with some embodiments.
Figure 13A:
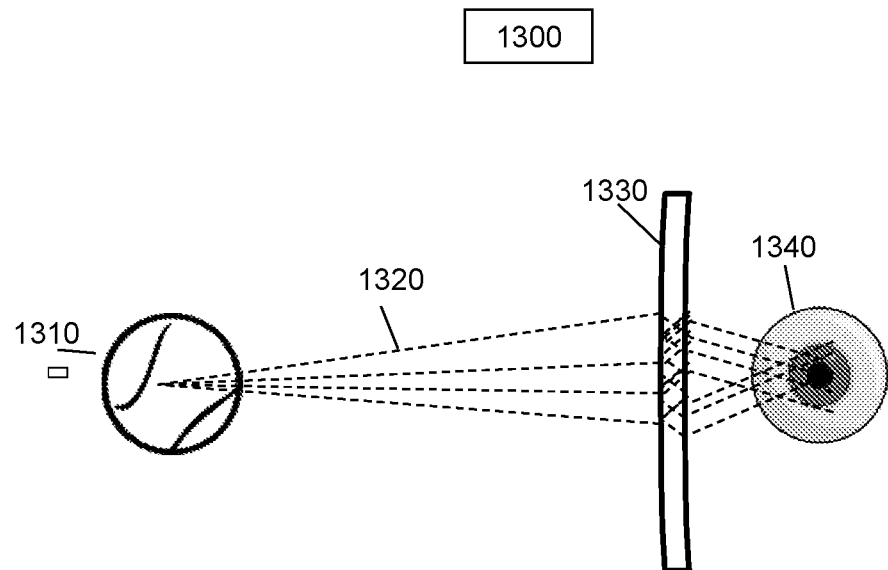
FIGS. 13A and 13B illustrate a schematic diagram of the implementation of methods from the system where the exemplary user is able to visualize 3d augmented reality food menus and food options at a plurality of establishments using interactive artificial intelligence iterative environments and geofence and geolocation technology where the users may order food and prepay for food delivered at any participating restaurant or food retailer while being transported in a vehicle or from a static location.
Figure 13B:
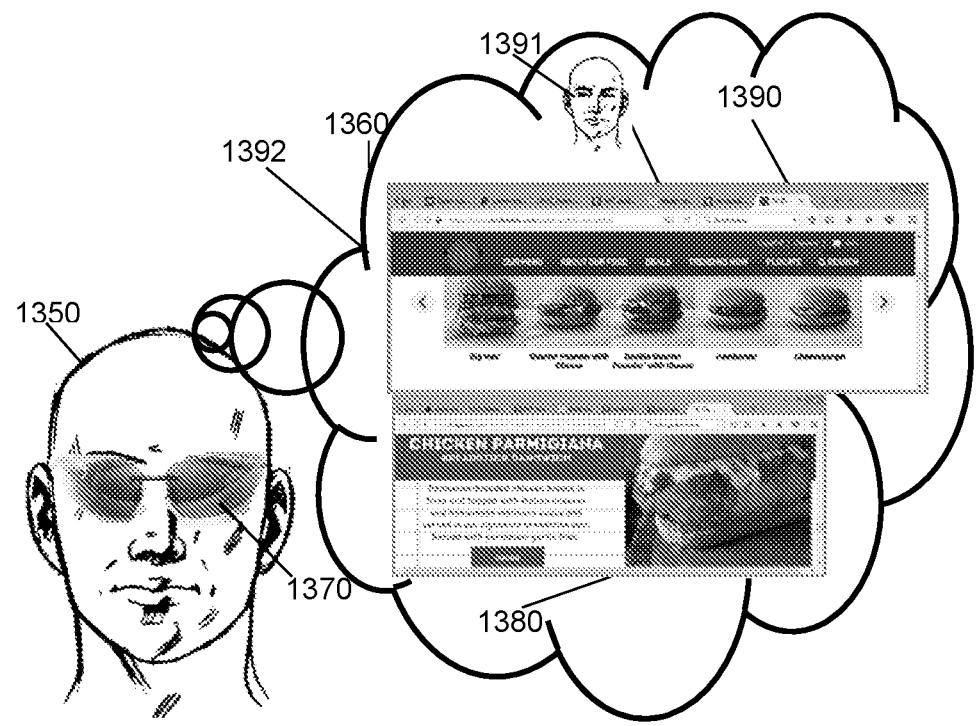
Figure 14A:
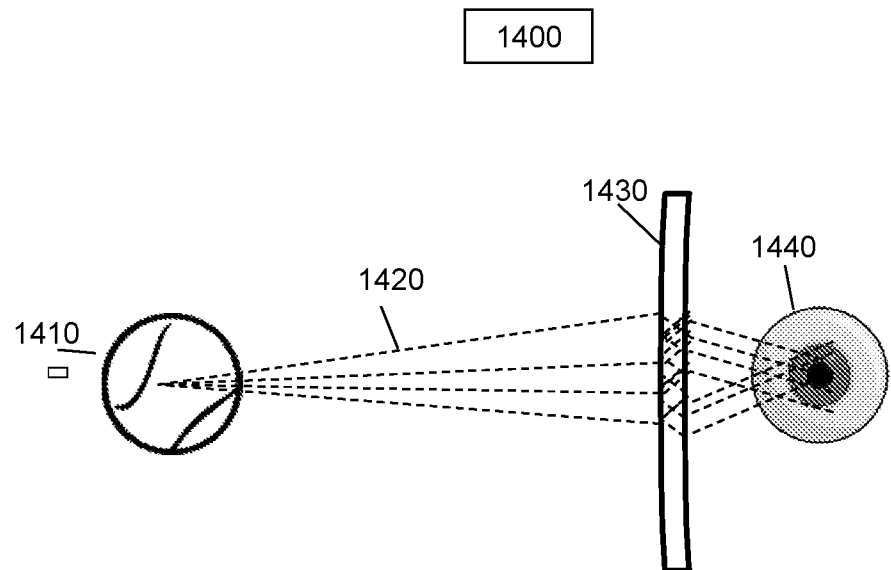
FIGS. 14A and 14B illustrate a schematic diagram of the implementation of methods from the system where the exemplary user is able to visualize themselves in a 3d augmented reality clothing or textiles or consumer good both in a first person and third person omniscient augmented interactive artificial intelligence iterative environments for the purpose of customized manufacturing, purchases and delivery.
Figure 14B:
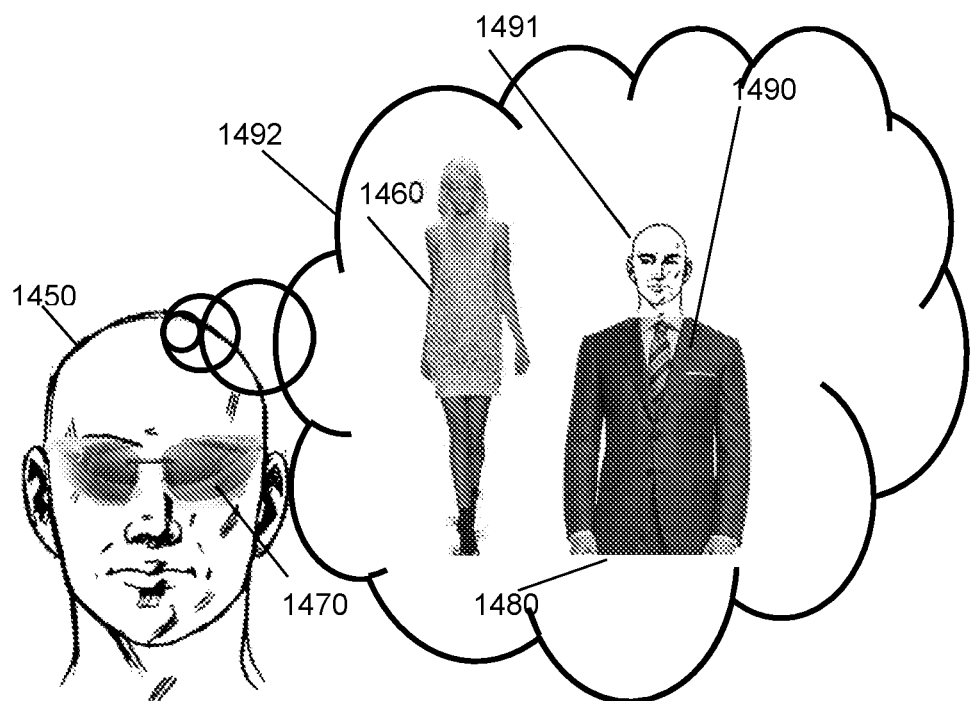
Figure 15A:
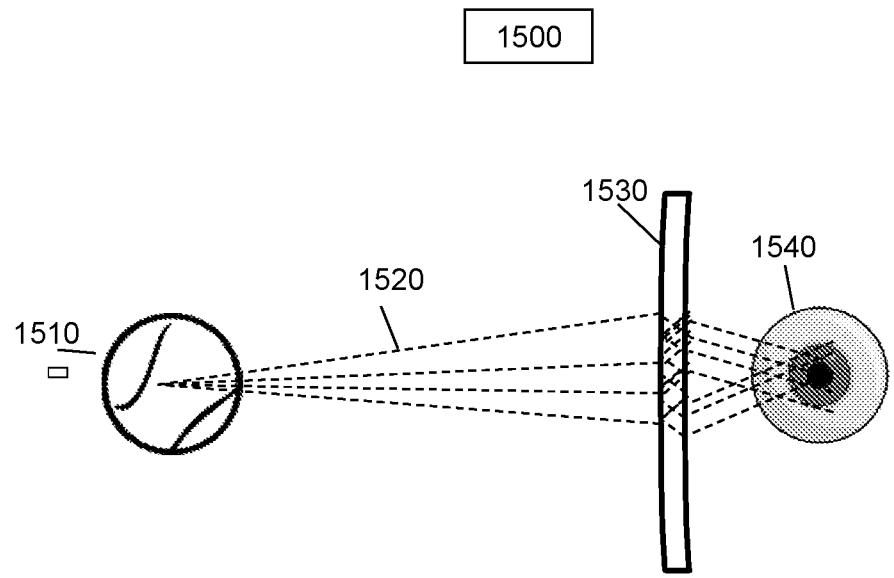
FIGS. 15A and 15B illustrate a schematic diagram of the implementation of methods from the system of the user's projected image to allow the user to visualize both a first person and third person omniscient augmented interactive artificial intelligence iterative environment where the users not only are able to see a demonstration of a professional athlete, but compare their movement variances for analysis.
Figure 15B:
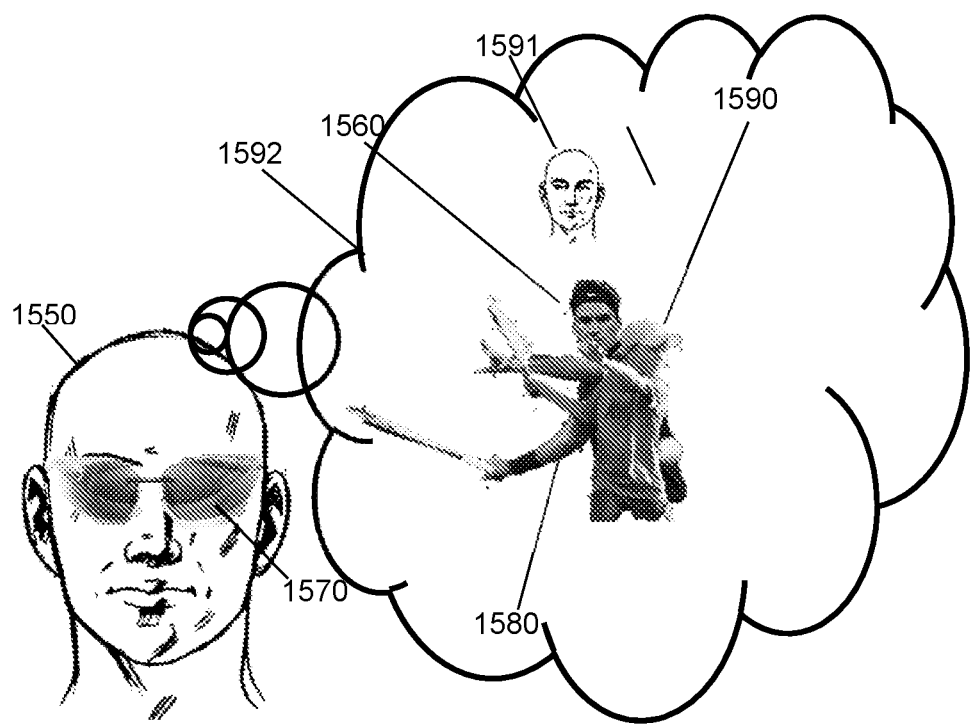

Examples of other applications in FIG. 12 that may be stored in memory 1102 include voice and word processing application, JAVA applications, HTML5 or subsequent web version language applications, encryption, digital rights management, voice recognition, human movement recognition, or human electromagnetic impulse recognition. In conjunction with images projected onto the planar waveguide lens 1030, the mobile CPU device 1125 and laser projection system and infrared tracking system 1114 may be used to manage the calendar 1201 or contacts 1214, including: adding name(s) to the calendar or address book; deleting names from the calendar and address contact list or book; associating names or contacts with phone numbers or emails or social networks or other networks; verifying identity from a network database; sorting names; distributing communication identity for voice, video or hologram communication, third person omniscient analysis 1560 and 1590 with network 150 and 130 database server 160 feedback using artificial intelligence to interact with the user 120.

In conjunction with RF circuitry 1106, audio circuitry 1108, speakers 1107, microphone 1109, laser projection and infrared detection laser systems 1114 the graphical user interface may be used to communicate with other users through the hologram connection communication system 1214. Hologram communication may be recorded for delayed delivery or conducted live. The remote recording capability of the recording CPU computing device may allow the user 120 to transmit text like communication as holograms or in script text. The artificial intelligence of the CPU 140 and database 160 may be used to communicate in multiple languages to any user 120 on the network 150. Hologram communication may be used to speak a language such as English and have the receiving user hear the hologram speak in Chinese. The translation module 1223 compiles network neurons to provide phrase mapping across various literary styles of writing in various languages. Phrase mapping is used along with neural networks for translation services 1223. Cooking assisted lessons from famous chefs 190 are on the cooking application 1207 with the ability to provide feedback in cooking technique and recipe variation from artificial intelligence on the network 150 and database server 160.

In conjunction with laser projection and infrared detection laser systems 1114, optical sensors 1116, camera 1113, microphone 1109, the graphical user interface may be used to capture still images or video (including a video stream) or hologram representation and store them into memory 1102. The user 120 may modify characteristics of a still image or video or hologram or delete them. The user 120 may arrange, modify, manipulate, present, store of delete still images or videos or holograms. The user 120 may play back videos, hologram representations stored in memory 1102 or accessed through the network 150 and database server 160.

In conjunction with laser projection and infrared detection laser systems 1114, optical sensors 1116, camera 1113, microphone 1109, the graphical user interface may be used to browse the internet module 1217 with traditional still representations, video representation or holographic representation.

In conjunction with laser projection and infrared detection laser systems 1114, optical sensors 1116, camera 1113, microphone 1109, calendar module 1201, contact module 1219, email module 1218, the graphical user interface may be used to search for a plurality of widgets or modules. In some embodiments a widget or module may include an HTML5 (recent or future version of a Hypertext Markup Language), CSS (cascading style sheets) or JavaScript or any future set of instructions the CPU can process for the holographic representation of the module.

In conjunction with RF circuitry 1106, audio circuitry 1108, speakers 1107, microphone 1109, GPS receiver 1120, laser projection and infrared detection laser systems 1114 the graphical user interface may utilize the transportation module 1205 which provides mathematical algorithms to minimize cost and transportation time across a variety of transportation systems. One embodiment of the transportation module 1205 utilizes the hub and spoke model which is more efficient than the point to point model. The point to point model consists of 45 routes for a network of N nodes where N=10 destination points. The hub and spoke model in the transportation module 1205 utilizes N−1 routes to optimize on miles driven subject to the constraint of maximizing persons in each vehicle. The hub and spoke model in the transportation module 1205 utilizes only 9 routes to service all 45 possible point combinations in a system of N=10 destination nodes subject to the constraint of maximizing vehicle capacity.

In conjunction with RF circuitry 1106, audio circuitry 1108, speakers 1107, microphone 1109, GPS receiver 1120, laser projection and infrared detection laser systems 1114, the graphical user interface may utilize the Shopping module 1225 which provides consumer good design creators the ability to display merchandise with three dimensional holograms. The three dimensional holograms have the ability to show the user 120 in both the first person and third person omniscient perspective where the graphical user interface shows the clothing on the user 120 by utilizing the laser projection and infrared detection laser systems 1114 to detect the current size and shape of the user to appropriately match and size consumer goods in the shopping module with the user 120.

In conjunction with RF circuitry 1106, audio circuitry 1108, speakers 1107, microphone 1109, GPS receiver 1120, laser projection and infrared detection laser systems 1114, the graphical user interface may utilize the real estate module 1208 to buy or sell houses or rent properties on an exchange-based system. The user 120 may buy or sell capacity in a house on a temporary or permanent basis through the real estate module 1208. The graphical user interface utilizes the laser projection and infrared projection system 1114 to display three dimensional hologram renderings and property tours for rent or purchase.

In conjunction with RF circuitry 1106, audio circuitry 1108, speakers 1107, microphone 1109, GPS receiver 1120, laser projection and infrared detection laser systems 1114, the graphical user interface may utilize the stock trading and commodity, currency and bond module 1210 to buy or sell securities on an exchange based system. The user 120 may tour the factory facilities of an investment with a hologram experience provided by the company whom is seeking investment or is publically or privately traded. The user 120 may participate in three dimensional hologram analyst calls or presentation with the management in real time. The infrared and laser detection system 1114 may record the eye movements and body language of company management to assess risky behavior or lying from the artificial intelligence database server 160 and network 150 to alert the user 120 of potential risk analysis.

In conjunction with RF circuitry 1106, audio circuitry 1108, speakers 1107, microphone 1109, GPS receiver 1120, laser projection and infrared detection laser systems 1114, the graphical user interface may the weather module 1202 to see hologram renderings of rain, cloud formations, sunrise or sunsets, tornado warnings, hurricane warnings, flood watches, and other weather data relevant to the user 120. The weather module 1202 may synchronize with the user's 120 calendar 1201 to alert the user for activities that will correspond to the users 120 calendar 1201 to alert the user 120 of proper clothing to wear or to reschedule appointments or outside activities that are at odds with the then current forecast in the weather module 1202.

In conjunction with RF circuitry 1106, audio circuitry 1108, speakers 1107, microphone 1109, GPS receiver 1120, laser projection and infrared detection laser systems 1114, the graphical user interface may be used for gaming and social media module 1221 to link everyday activity and transactions with helping people in developing areas of the world. Additional description of the module to link everyday transactions with helping people in developing areas of the world can be found in U.S. patent application Ser. No. 15/266,326, "Implementations of various methods to create economic incentives to directly link users of a social network or social network reality game to actual projects and people within a charity or developing world area," filed Sep. 15, 2016, the content of which is hereby incorporated by reference in its entirety.

In conjunction with RF circuitry 1106, audio circuitry 1108, speakers 1107, microphone 1109, GPS receiver 1120, laser projection and infrared detection laser systems 1114, the graphical user interface may be used for listening to music with the music module 1206 with a live band in the room. The holograms of band members and instruments may be interactive with the laser projection and infrared detection laser system 1114 to include the user 120 in the band as a singer or musician. Artificial intelligence feedback from the database server 160 and network 150 may provide the user with interactive feedback and dialogue with band members. The camera 1113 may also record renderings of the user 591 performing with the band for posting on social media or local or cloud based network platforms.

In conjunction with RF circuitry 1106, audio circuitry 1108, speakers 1107, microphone 1109, GPS receiver 1120, laser projection and infrared detection laser systems 1114, the graphical user interface may be used to order food with the cooking and food module 1207 and 1225. The GPS receiver locates prepared and raw ingredient alternative shopping locations within a geofence near the user 1350 where the user 1350 sees three dimensional holograms rendering of the prepared or raw product. The artificial intelligence algorithms based on analysis from the user's 1350 blood markers and saliva markers provide mathematically optimized food intake based on the science of the user's 1350 specific body chemistry. Based on the user's 1350 selection of the three dimensional rendering of the food product 1390, the food product 1390 may be delivered to the user's 1350 place of work or residence or another alternative meeting point including but not limited to, the place at which the food was produced or prepared. The transaction for the food product 1390 is connected to the user's 1350 financial account information where the user 1350 stored the information in the memory 1102 or database server 160 to provide instant payment to the vendor or service provider.

In conjunction with RF circuitry 1106, audio circuitry 1108, speakers 1107, microphone 1109, GPS receiver 1120, laser projection and infrared detection laser systems 1114, the graphical user interface may be used to order custom fit clothing 1460 or consumer goods 1490 based upon the measurements provided by the laser projection and infrared detection laser systems 1114. The three dimensional rendering of the clothing or consumer goods has the option to view with a model rendered by the merchant or from a third person omniscient perspective placing the clothing or consumer good on the user 1491 and 1490. Based on the user's 1450 selection of the three dimensional rendering of the clothing 1490 or consumer good 1460, the product may be delivered to the user's 1450 place of work or residence or another alternative meeting point including but not limited to the place at which the product was produced or prepared. The transaction for the product 1490 is connected to the user's 1450 financial account information where the user 1450 stored the information in the memory 1102 or database server 160 to provide instant payment to the vendor or service provider.

In conjunction with RF circuitry 1106, audio circuitry 1108, speakers 1107, microphone 1109, GPS receiver 1120, laser projection and infrared detection laser systems 1114, the graphical user interface may be used to perform analysis on the biomechanical movements of the user 1550 or 1590 or 1591 compared to the movements of a professional athlete 1560 or trained professional 1560 based upon the measurements of the user's 1590 movements provided by the laser projection and infrared detection laser systems 1114 and in contrast to the movements of the trained professional 1560. The change analysis between the two three dimensional holographic renderings are geared towards competitive training and instruction in any given field of athletics, music, work or other trained skill. The three dimensional rendering of the trained professional has the option to view stand alone or from a third person omniscient perspective placing the trained professional hologram on the user 1591 and 1590. Based on the user's 1550 movement of the three dimensional rendering of the trained professional 1560, an instructive video may be rendered for the user 1550 or for the user 1550 to post to social media or another cloud based network subject to copyright laws.

What is claimed is:

1. A method, comprising:
    receiving environment data acquired using one or more sensors of a projection device, wherein the environment data comprises data corresponding to a physical environment proximate to a plurality of users, wherein the one or more sensors comprise a satellite navigation system receiver;
    generating an interactive environment for the plurality of users based on the environment data, wherein the interactive environment comprises an augmented reality (AR) environment, a mixed reality (MR) environment, or a virtual reality (VR) environment associated with one or more applications, wherein the one or more applications comprise one or more exchange-based applications;

generating image data based on the interactive environment, wherein the image data corresponds to one or more images associated with the interactive environment; and transmitting the image data to the projection device, wherein the projection device is configured to transmit the image data to a plurality of viewing devices configured to project the interactive environment to the plurality of users.

2. The method of claim 1, wherein generating the interactive environment comprises generating the AR environment, MR environment, or the VR environment associated with the one or more applications based on data acquired using the satellite navigation system receiver.

3. The method of claim 1, wherein the satellite navigation system receiver comprises a Global Positioning System (GPS) receiver.

4. The method of claim 1, wherein the one or more exchange-based applications comprise a real estate application, a commodities application, a transportation application, or combinations thereof.

5. The method of claim 1, wherein the one or more applications comprise a transportation application, wherein the transportation application is configured to utilize one or more algorithms to minimize cost and transportation time for one or more transportation systems.

6. The method of claim 5, wherein the transportation application is configured to utilize a hub and spoke model.

7. The method of claim 1, wherein the one or more images associated with the interactive environment comprise one or more images associated with the one or more applications.

8. The method of claim 1, wherein the projection device is further configured to provide access to the one or more applications to the plurality of users within the projected environment.

9. The method of claim 1, wherein the projection device is further configured to transmit the image data to the plurality of viewing devices in the form of laser light, infrared light, or combinations thereof.

10. The method of claim 1, wherein the projection device is further configured to transmit the image data to the plurality of viewing devices from a location that is substantially central to the plurality of users.

11. The method of claim 1, wherein the interactive environment is configured to allow one or more virtual interactions between a first user and a second user of the plurality of users.

12. A system, comprising:
one or more processors; and
at least one memory, comprising a plurality of program instructions which, when executed by the one or more processors, cause the one or more processors to:
receive environment data acquired using one or more sensors of a projection device, wherein the environment data comprises data corresponding to a physical environment proximate to a plurality of users, wherein the one or more sensors comprise a satellite navigation system receiver;
generate an interactive environment for the plurality of users based on the environment data, wherein the interactive environment comprises an augmented reality (AR) environment, a mixed reality (MR) environment, or a virtual reality (VR) environment associated with one or more applications, wherein the one or more applications comprise one or more exchange-based applications;
generate image data based on the interactive environment, wherein the image data corresponds to one or more images associated with the interactive environment; and
transmit the image data to the projection device, wherein the projection device is configured to transmit the image data to a plurality of viewing devices configured to project the interactive environment to the plurality of users.

13. The system of claim 12, wherein the plurality of program instructions which, when executed by the one or more processors, cause the one or more processors to generate the interactive environment further cause the one or more processors to generate the AR environment, MR environment, or the VR environment associated with the one or more applications based on data acquired using the satellite navigation system receiver.

14. The system of claim 12, wherein the satellite navigation system receiver comprises a Global Positioning System (GPS) receiver.

15. The system of claim 12, wherein the one or more exchange-based applications comprise a real estate application, a commodities application, a transportation application, or combinations thereof.

16. The system of claim 12, wherein the one or more applications comprise a transportation application, wherein the transportation application is configured to utilize one or more algorithms to minimize cost and transportation time for one or more transportation systems.

17. A non-transitory computer-readable medium having stored thereon a plurality of computer-executable instructions which, when executed by a computer, cause the computer to:
receive environment data acquired using one or more sensors of a projection device, wherein the environment data comprises data corresponding to a physical environment proximate to a plurality of users, wherein the one or more sensors comprise a satellite navigation system receiver;
generate an interactive environment for the plurality of users based on the environment data, wherein the interactive environment comprises an augmented reality (AR) environment, a mixed reality (MR) environment, or a virtual reality (VR) environment associated with one or more applications, wherein the one or more applications comprise one or more exchange-based applications;
generate image data based on the interactive environment, wherein the image data corresponds to one or more images associated with the interactive environment; and
transmit the image data to the projection device, wherein the projection device is configured to transmit the image data to a plurality of viewing devices configured to project the interactive environment to the plurality of users.

18. The non-transitory computer-readable medium of claim 17, wherein the one or more images associated with the interactive environment comprise one or more images associated with the one or more applications.

19. The non-transitory computer-readable medium of claim 17, wherein the projection device is further configured to provide access to the one or more applications to the plurality of users within the projected environment.

20. The non-transitory computer-readable medium of claim 17, wherein the interactive environment is configured to allow one or more virtual interactions between a first user and a second user of the plurality of users.

* * * * *